US010480502B2

(12) United States Patent
Hirata et al.

(10) Patent No.: US 10,480,502 B2
(45) Date of Patent: Nov. 19, 2019

(54) FLUID CONTROL DEVICE AND PUMP

(71) Applicant: Murata Manufacturing Co., Ltd., Kyoto (JP)

(72) Inventors: Atsuhiko Hirata, Kyoto (JP); Yukiharu Kodama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 307 days.

(21) Appl. No.: 15/241,576

(22) Filed: Aug. 19, 2016

(65) Prior Publication Data

US 2017/0058882 A1 Mar. 2, 2017

Related U.S. Application Data

(63) Continuation of application No. PCT/JP2015/054531, filed on Feb. 19, 2015.

(30) Foreign Application Priority Data

Feb. 21, 2014 (JP) ................................ 2014-031372
Sep. 4, 2014 (JP) ................................ 2014-180355

(51) Int. Cl.
*F04B 45/047* (2006.01)
*F04B 43/04* (2006.01)

(52) U.S. Cl.
CPC ............ *F04B 45/047* (2013.01); *F04B 43/04* (2013.01); *F04B 43/046* (2013.01)

(58) Field of Classification Search
CPC ...... F04B 17/003; F04B 19/006; F04B 43/04; F04B 43/043; F04B 43/046; F04B 43/0054; F04B 45/047; H01L 41/0973
See application file for complete search history.

(56) References Cited

U.S. PATENT DOCUMENTS 4,636,149 A * 1/1987 Brown .................... F04B 43/04
417/322
6,227,824 B1 5/2001 Stehr
(Continued)

FOREIGN PATENT DOCUMENTS

CN 102979704 A 3/2013
JP H10-511165 A 10/1998
(Continued)

OTHER PUBLICATIONS

Office Action issued in Japanese Patent Application No. 2015-236249 dated Aug. 29, 2016.
(Continued)

*Primary Examiner* — Patrick Hamo
*Assistant Examiner* — Joseph S. Herrmann
(74) *Attorney, Agent, or Firm* — Pearne & Gordon LLP

(57) ABSTRACT

A pump (1) includes a vibrating plate (15) that has a central part (21), a frame part (22), and connecting parts (23 to 26), a piezoelectric element (16) that is stacked over the central part (21) and configured to cause flexural vibrations to occur concentrically from the central part (21) to the connecting parts (23 to 26), and an opposed plate (13) that is stacked over the frame part (22) and positioned facing each of the connecting parts (23 to 26) with a spacing therebetween. The vibrating plate (15) has such a resonant mode that an antinode occurs in each of the central part (21) and the connecting parts (23 to 26). The opposed plate (13) has, at positions facing the connecting parts (23 to 26), a plurality of channel holes (39 to 43) through which a fluid flows.

21 Claims, 15 Drawing Sheets

(56) References Cited

U.S. PATENT DOCUMENTS

| | | | |
|---|---|---|---|
| 7,565,744 B2* | 7/2009 | Matsui | F04B 43/043 |
| | | | 137/512 |
| 9,103,337 B2* | 8/2015 | Hirata | F04B 43/046 |
| 9,151,284 B2* | 10/2015 | Hirata | F04B 45/047 |
| 9,433,359 B2* | 9/2016 | Sano | F04B 43/046 |
| 2011/0070109 A1* | 3/2011 | Kanai | F04B 45/047 |
| | | | 417/410.2 |
| 2013/0058809 A1 | 3/2013 | Hirata et al. | |
| 2013/0058810 A1* | 3/2013 | Hirata | F04B 43/043 |
| | | | 417/413.2 |
| 2013/0058818 A1 | 3/2013 | Hirata et al. | |
| 2015/0071797 A1* | 3/2015 | Takeuchi | F04B 43/0054 |
| | | | 417/413.2 |
| 2015/0150470 A1 | 6/2015 | Sano et al. | |

FOREIGN PATENT DOCUMENTS

| | | |
|---|---|---|
| JP | 2009-121335 A | 6/2009 |
| JP | 2013-053611 A | 3/2013 |
| JP | 2013-068215 A | 4/2013 |
| JP | 2013-245649 A | 12/2013 |
| JP | 5850208 B1 | 2/2016 |
| WO | 2011-145544 A1 | 11/2011 |
| WO | 2013-130255 A1 | 9/2013 |
| WO | 2013-134056 A1 | 9/2013 |
| WO | 2013-187271 A1 | 2/2016 |

OTHER PUBLICATIONS

International Search Report Issued in Patent Application No. PCT/JP2015/054531 dated May 19, 2015.
Written Opinion Issued in Patent Application No. PCT/JP2015/054531 dated May 19, 2015.

* cited by examiner

SECOND ANTINODE   FIRST ANTINODE   SECOND ANTINODE

SECOND ANTINODE

MAJOR AXIS DIRECTION   MINOR AXIS DIRECTION

FLUID CONTROL DEVICE AND PUMP

This is a continuation of International Application No. PCT/JP2015/054531 filed on Feb. 19, 2015 which claims priority from Japanese Patent Application No. 2014-180355 filed on Sep. 4, 2014 and Japanese Patent Application No. 2014-031372 filed Feb. 21, 2014. The contents of these applications are incorporated herein by reference in their entireties.

BACKGROUND OF THE DISCLOSURE

Field of the Disclosure

The present disclosure relates to a fluid control device that controls the flow of fluid by using a driver in which vibration is produced, and a pump that includes the fluid control device and sucks and discharges fluid.

Description of the Related Art

Pumps that utilize vibration of a piezoelectric element are commonly used (see, for example, Patent Documents 1 and 2). Such pumps are used for purposes such as directing outside air on a component that has risen in temperature to cool the component, and conveying fluid such as oxygen in a fuel cell.

FIG. 16 schematically illustrates major components of a conventional pump. A conventional pump 101 illustrated in FIG. 16 includes a housing 102, a vibrating plate 103, an opposed plate 104, and a piezoelectric element 105. The vibrating plate 103, the opposed plate 104, and the piezoelectric element 105 are accommodated in the housing 102. The opposed plate 104 defines a pump chamber 110 inside the housing 102. The vibrating plate 103, which is provided inside the pump chamber 110, is positioned facing the opposed plate 104 with a spacing therebetween. The outer peripheral portion of the vibrating plate 103 is elastically supported by the housing 102. The piezoelectric element 105 is stuck on the vibrating plate 103, forming an actuator 111 together with the vibrating plate 103. The housing 102 has, on its upper face, a channel hole 112 that provides communication between the inside and outside of the pump chamber 110. The opposed plate 104 is provided with a channel hole 113 that communicates with the inside of the pump chamber 110. The housing 102 has, on its lower face, channel holes 114 that communicate with the pump chamber 110 through the channel hole 113 and also with the outside.

When voltage is applied to the piezoelectric element 105 of the pump 101, the vibrating plate 103 undergoes flexural vibration in the thickness direction as the piezoelectric element 105 attempts to expand or contract in the in-plane direction. This creates pressure fluctuations in the fluid layer that is sandwiched between the vibrating plate 103 and the opposed plate 104 inside the pump chamber 110, producing a fluid flow such that the fluid is sucked into the pump chamber 110 through the channel holes 114 and 113 and the fluid is discharged to the channel hole 112 from the pump chamber 110.

Patent Document 1: Japanese Unexamined Patent Application Publication No. 2013-068215

Patent Document 2: Japanese Unexamined Patent Application Publication No. 2013-053611

BRIEF SUMMARY OF THE DISCLOSURE

There are demands for reduced physical size and improved driving efficiency of this type of pump. Unfortunately, a reduction in the physical size of the pump tends to lead to a decrease in driving efficiency. Thus, with conventional structures, it is difficult to achieve both reduced physical size and improved driving efficiency at the same time.

Accordingly, it is an object of the present disclosure to provide a fluid control device and a pump having improved driving efficiency over conventional designs without an increase in physical size, or reduced physical size over conventional designs without a decrease in driving efficiency.

A fluid control device according to the present disclosure includes a vibrating plate that has a central part, a frame part surrounding the central part, and a connecting part connecting between the central part and the frame part, a driver stacked over the central part, the driver being configured to vibrate the vibrating plate in a flexural manner from the central part to the connecting part, and an opposed plate stacked over the frame part, the opposed plate being positioned facing at least the connecting part with a spacing between the opposed plate and the connecting part. The vibrating plate has a resonant mode such that an antinode occurs in each of the central part and the connecting part. The opposed plate has a plurality of channel holes though which a fluid flows, the channel holes being each located at a position facing the connecting part.

According to this configuration, channel holes are each positioned facing the connecting part where an antinode is formed. As a result, the total amount of parallel fluid flows through the channel holes can be increased. This allows for an improvement in driving efficiency, thus enabling a reduction in physical size while achieving a desired flow rate or pressure.

The connecting part may include, at a position facing each of the channel holes, a striking part that is locally increased in width as viewed from the channel hole. This configuration allows the amplitude of vibration of the striking part to be increased, without decreasing the area over which the vibrating plate (striking part) and the fluid are positioned facing each other in the vicinity of the channel holes that directly contribute to fluid control. This makes it possible to reduce unwanted load on the vibrating plate and the driver, thus improving driving efficiency.

The connecting part may include a projection that is provided at a position facing each of the channel holes and projects toward the channel hole. Alternatively, the opposed plate may include, around each of the channel holes, a projection that projects toward the vibrating plate. As a result of these configurations, in comparison to the spacing provided between the vibrating plate and the opposed plate in the vicinity of the channel holes that directly contribute to fluid control, the spacing between the vibrating plate and the opposed plate in other areas can be increased. This makes it possible to reduce unwanted load on the vibrating plate and the driver to further improve driving efficiency.

The opposed plate may include a movable part capable of flexion provided around each of the channel holes, and a restraining part that restrains an area around the movable part. For example, the movable part can be provided by forming the opposed plate with reduced thickness in the movable part and with increased thickness in the restraining part. Alternatively, for example, the movable part can be formed by providing the channel plate, which is stacked over the side of the opposed plate opposite to the vibrating plate, with an opening that is positioned facing each of the channel holes of the opposed plate and the area around the channel hole. With this configuration, vibration of the connecting part also causes the movable part positioned facing the connecting part to vibrate in response to this vibration. The vibration of the movable part and the vibration of the connecting part then couple, allowing fluid to flow through each channel hole in a fixed direction even without the presence of a structure that regulates the direction of fluid flow, such as a check valve. This facilitates fluid flow while eliminating the need for a component such as a check valve, thus allowing for improved driving efficiency.

Preferably, the movable part has such a shape in plan view that has a major axis extending in a direction in which antinodes are produced uniformly in the connecting part, and a minor axis extending in a direction orthogonal to the major axis, for example, an elliptical shape or an oval shape. This configuration allows the movable part to be increased in dimension in the major axis direction while preventing a decrease in the natural frequency of the movable part. As a result, the amplitude of vibration occurring near each end portion along the major axis of the movable part can be increased in comparison to when the movable part has the shape of a perfect circle. When vibration causes both principal faces of the connecting part positioned facing the movable part to undergo expansion or contraction in the minor axis direction, an opposite contraction or expansion is produced in the major axis direction. This creates such a vibration in the connecting part that causes the connecting part to flex as viewed in the minor axis direction. This vibration has maximum amplitude at each end along the major axis of the connecting part. Consequently, if vibration produced in the movable part positioned facing the connecting part has a small amplitude at each end portion along the major axis of the movable part, a collision with the connecting part can occur. Accordingly, the amplitude of vibration produced at each end portion along the major axis of the movable part is increased as described above, thus reducing the risk of a collision with the connecting part positioned facing the movable part. This makes it possible to, for example, prevent occurrence of abnormal vibration or noise, or prevent a decrease in pressure caused by such a collision.

The channel of the channel part includes an opening that is positioned facing each of the channel holes of the opposed plate and an area around the channel hole, an extension that is extended laterally from the opening, and a channel hole that is open to an external space and communicates with the opening through the extension. This configuration allows each channel hole of the opposed plate and the channel hole of the cover plate to be positioned away from each other in plan view, thus reducing leakage of vibrating sound generated by vibration of the vibrating plate.

Preferably, the components stacked over the frame part of the vibrating plate each have a coefficient of linear expansion substantially equal to the coefficient of linear expansion of the vibrating plate. This makes it possible to further reduce deformation resulting from a difference in coefficient of linear expansion.

The opposed plate may be stacked over the vibrating plate by using an adhesive containing electrically conductive particles. Preferably, in this case, the electrically conductive particles have a diameter equivalent to the spacing between the opposed plate and the vibrating plate. This configuration ensures a uniform, desired spacing between the opposed plate and the vibrating plate even when the opposed plate and the vibrating plate are bonded together with an adhesive. This makes it possible to reduce variations in the performance of the fluid control device.

Preferably, the vibrating plate and the opposed plate are each made of an electrically conductive material, the opposed plate is stacked over the vibrating plate by using an adhesive containing electrically conductive particles, and the electrically conductive particles have a diameter equivalent to the spacing between the opposed plate and the vibrating plate. This configuration ensures a uniform, desired spacing between the opposed plate and the vibrating plate even when the opposed plate and the vibrating plate are bonded together with an adhesive. This makes it possible to reduce variations in the performance of the fluid control device. Further, power can be fed to the driver through the opposed plate.

The fluid control device may include an insulating layer stacked over the frame part, the insulating layer being positioned over a side of the vibrating plate over which the driver is stacked, and a power feeding plate stacked over the vibrating plate with the insulating layer interposed between the power feeding plate and the vibrating plate, the power feeding plate having an internal connection terminal formed in a part of the power feeding plate, the internal connection terminal being connected to the driver. With this configuration, the presence of the insulating layer prevents the power feeding plate and the vibrating plate from being brought into electrical continuity with each other, thus allowing power to be fed to the driver through the power feeding plate.

In this case, the insulating layer may include an adhesive mixed with non-electrically conductive particles. With this configuration, the non-electrically conductive particles reliably prevent electrical continuity between the power feeding plate and the vibrating plate.

The insulating layer may include an insulating coating provided between the vibrating plate and the power feeding plate. With this configuration, the insulating coating reliably prevents electrical continuity between the power feeding plate and the vibrating plate. The presence of the insulating coating eliminates the need for the adhesive to contain non-electrically conductive particles, thus allowing for easy construction of the insulating layer.

The fluid control device may further include a metal plate stacked over the frame part of the vibrating plate. With this configuration, even when the insulating layer stacked between the vibrating plate and the power feeding plate is made of a soft material with a low density and a low Young's modulus, such as resin, the presence of the metal plate between the vibrating plate and the insulating layer allows the connecting part of the vibrating plate to be reliably secured in place, thus preventing vibration from leaking to other components through the frame part. This prevents driving efficiency or other performance features of the fluid control device from decreasing. The insulating layer may be formed by a coating of insulating film applied on the surface of the metal plate. In this case as well, stacking the vibrating plate and the insulating layer with the metal plate interposed therebetween allows the connecting part of the vibrating plate to be reliably secured in place.

The frame part of the vibrating plate may have a groove located on a side of the vibrating plate over which the driver is stacked, and the insulating layer and the power feeding plate may be disposed in the groove. This configuration allows the thickness of the device to be reduced.

Preferably, the opposed plate may have a channel hole also at a position facing the central part. This configuration allows the number of channel holes to be further increased, thus enabling a further improvement in features such as flow rate and driving efficiency.

Preferably, the fluid control device further includes a stacking plate further stacked over the vibrating plate and the driver, the vibrating plate, the driver, and the stacking plate form three layers including an upper layer, a middle layer, and a lower layer, and the magnitude relationship of the coefficient of linear expansion of the middle layer with respect to the coefficient of linear expansion of the upper layer is identical to the magnitude relationship of the coefficient of linear expansion of the middle layer with respect to the coefficient of linear expansion of the lower layer. This configuration makes it possible to reduce deformation in components such as the vibrating plate and the driver resulting from the difference in coefficient of linear expansion between the vibrating plate and the driver.

Preferably, among the three layers including the vibrating plate, the driver, and the stacking plate, a component corresponding to a layer in contact with the driver has a coefficient of linear expansion greater than the coefficient of linear expansion of the driver. This configuration causes compressive stress to be exerted on the driver, thus reducing breakage of the driver. If the driver is present in the middle layer, compressive stress can be uniformly exerted on the driver, thus reducing breakage of the driver compared to cases such as when a two-layer construction is employed or when the driver is disposed in the upper layer or lower layer.

Preferably, the opposed plate includes a first opposed plate and a second opposed plate, the first opposed plate being disposed facing one principal face of the vibrating plate, the second opposed plate being disposed facing the other principal face of the vibrating plate. This configuration allows a greater number of channel holes to be provided in the opposed plate, thus enabling a further improvement in features such as flow rate and driving efficiency.

Desirably, the driver includes a first driver and a second driver, the first driver being disposed facing one principal face of the vibrating plate, the second driver being disposed facing the other principal face of the vibrating plate. This configuration makes it possible to reduce deformation in the stack of the vibrating plate and the driver resulting from the difference in coefficient of linear expansion between the vibrating plate and the driver, while increasing the amplitude of vibration of the vibrating plate. This enables a further improvement in features such as flow rate and driving efficiency.

Preferably, the pump according to the present disclosure includes the above-mentioned fluid control device, has a pump chamber that accommodates the vibrating plate and the driver, and the opposed plate forms a part of the inner wall of the pump chamber.

According to the present disclosure, channel holes are each positioned facing the connecting part of the vibrating plate, allowing for an increase in the amount of fluid entering or exiting through the channel holes. This enables an improvement in driving efficiency without an increase in physical size, or enables a reduction in physical size without a decrease in driving efficiency.

Figure 3A:
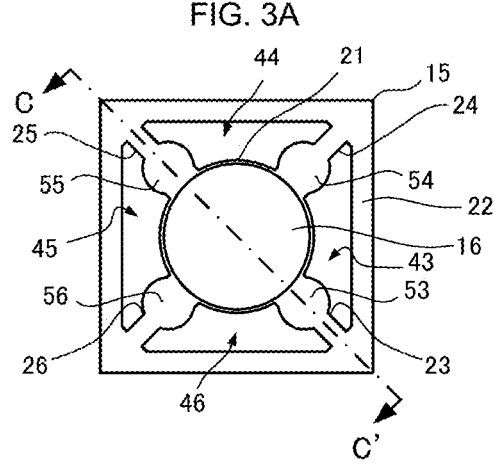
Figure 3B:
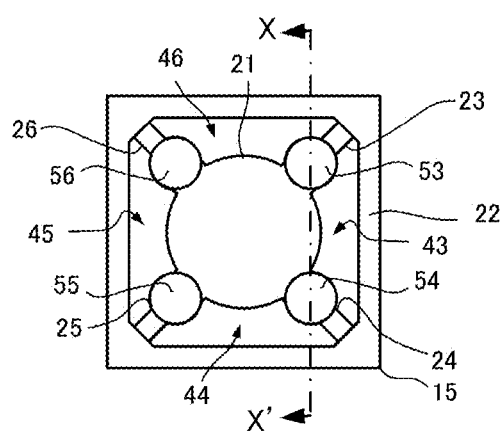
Figure 3C:
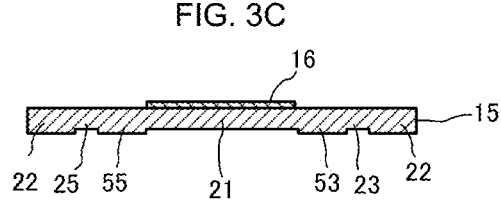

Each of FIG. 3A-3C illustrates a vibrating plate and a piezoelectric element according to the first embodiment of the present disclosure.

Figure 4:
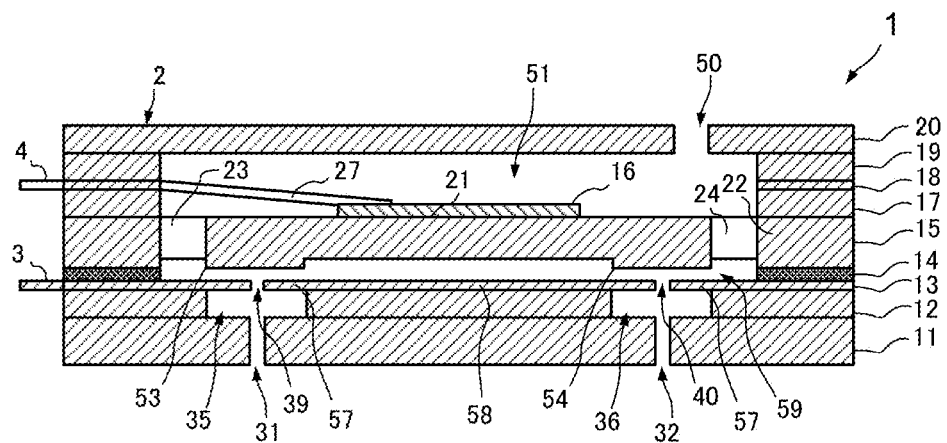

FIG. 4 is a cross-sectional view of the pump according to the first embodiment of the present disclosure.

Figure 5A:
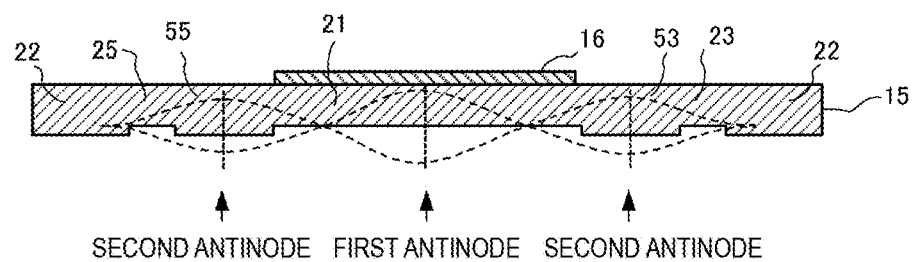
Figure 5B:
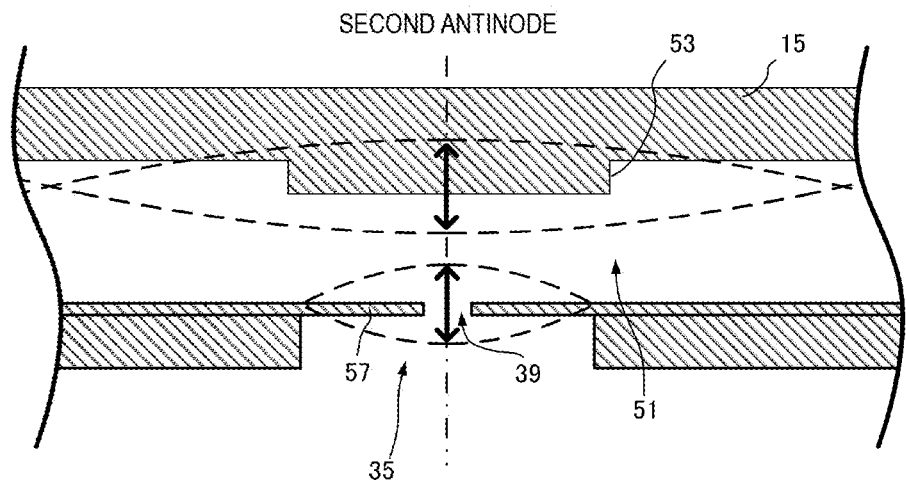

Each of FIGS. 5A and 5B schematically illustrates the operation of a fluid control part according to the first embodiment of the present disclosure.

Figure 6:
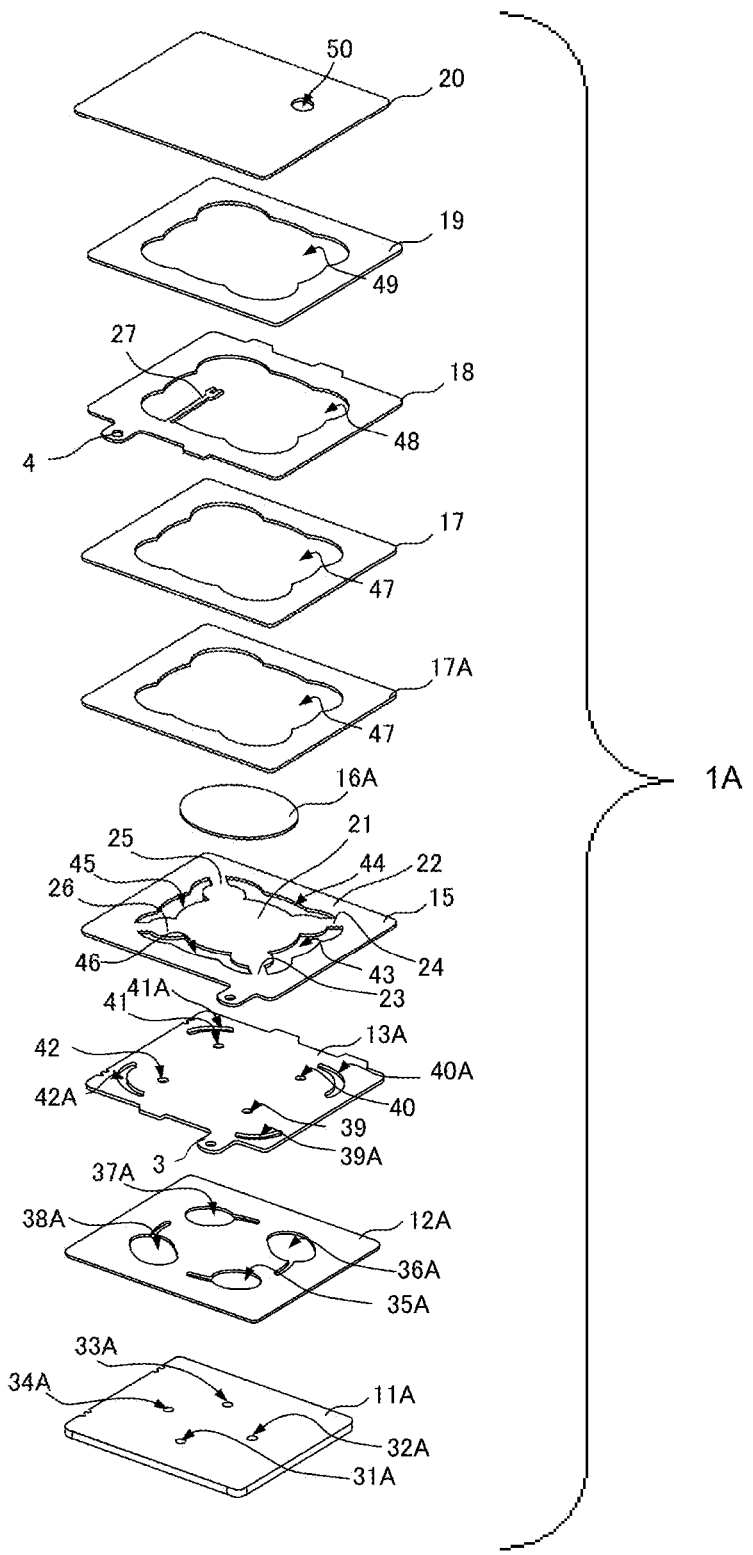

FIG. 6 is an exploded perspective view of a pump according to a second embodiment of the present disclosure.

Each of FIG. 7A-7D is a plan view of a vibrating plate, an opposed plate, a channel plate, and a cover plate according to the second embodiment of the present disclosure.

Figure 8A:
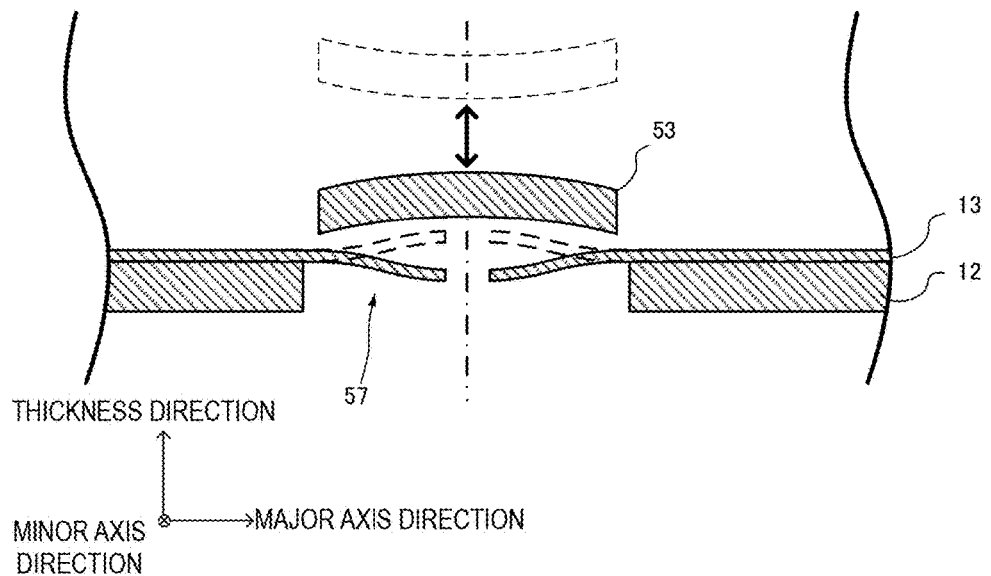
Figure 8B:
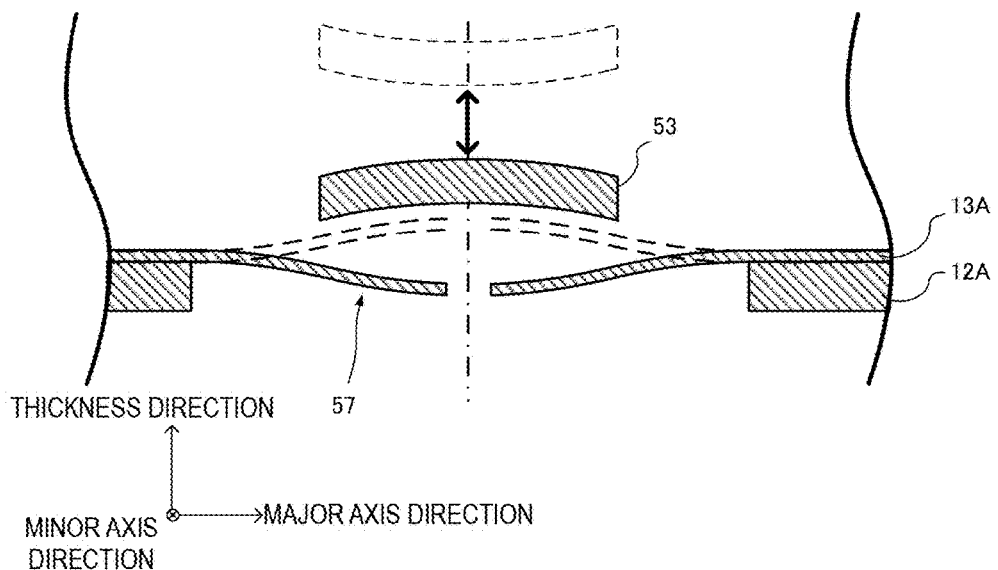

Each of FIGS. 8A and 8B schematically illustrates how the vibrating plate and the opposed plate vibrate according to the second embodiment of the present disclosure.

Figure 9:
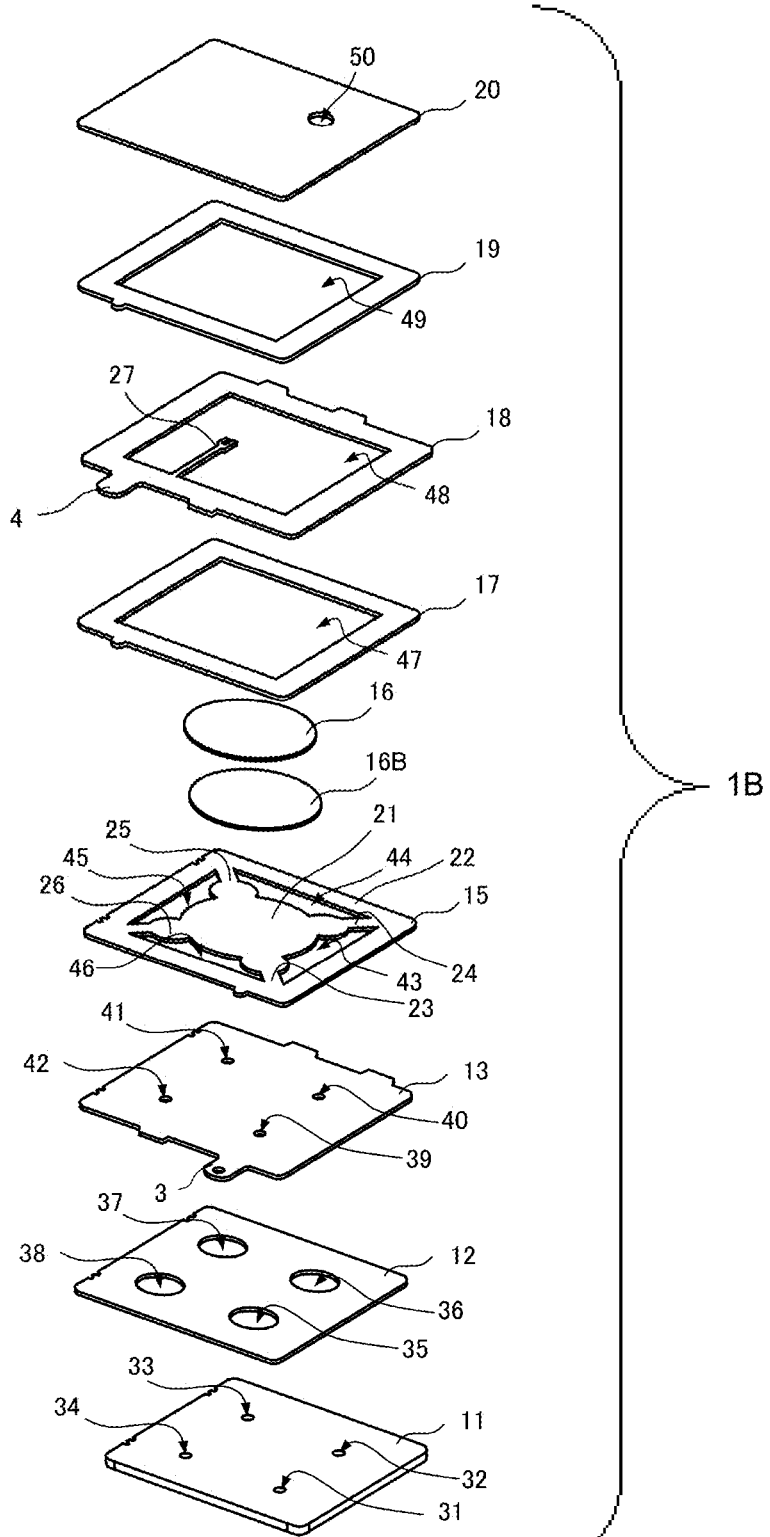

FIG. 9 is an exploded perspective view of a pump according to a third embodiment of the present disclosure.

Figure 10:
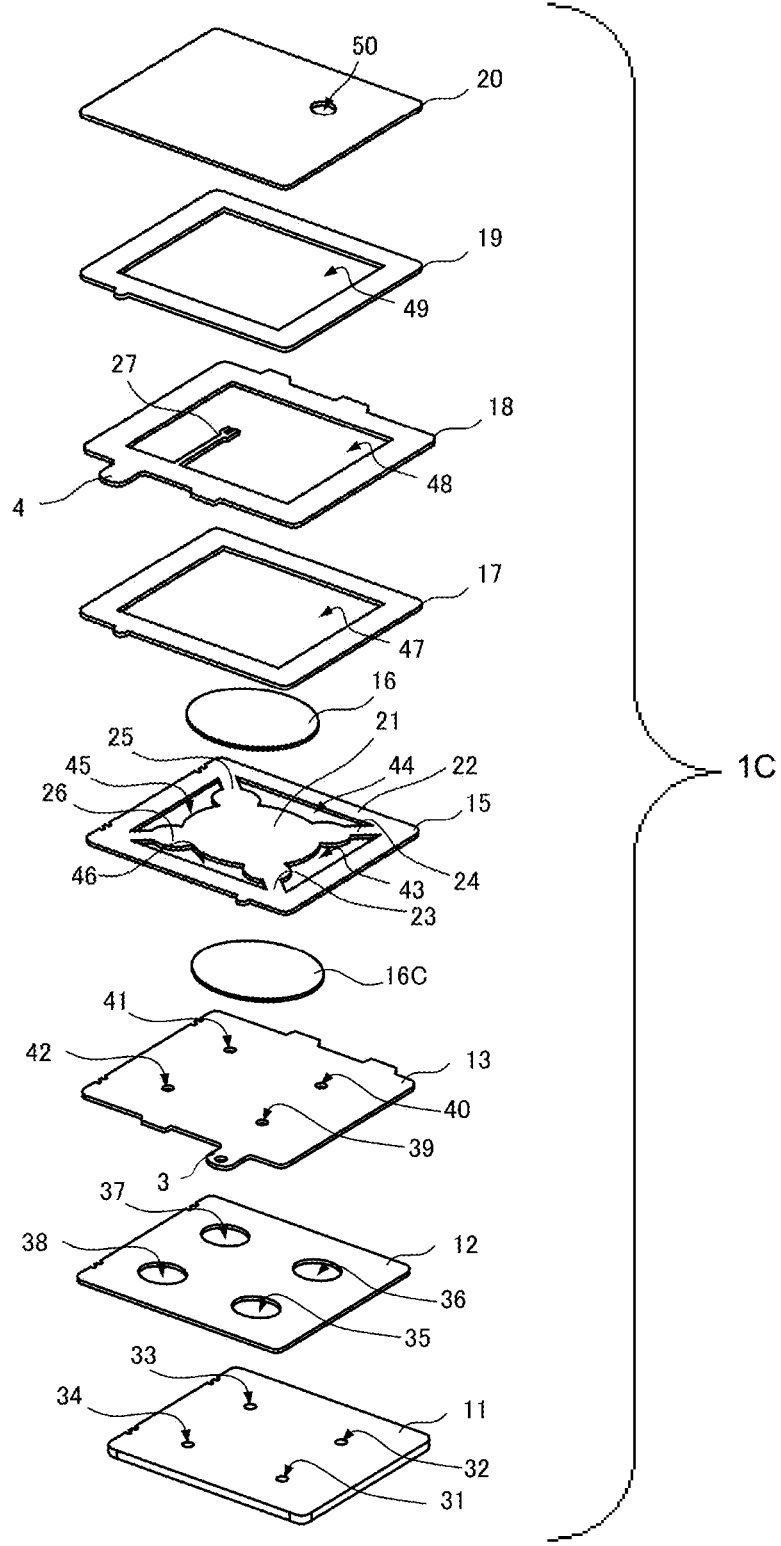

FIG. 10 is an exploded perspective view of a pump according to a fourth embodiment of the present disclosure.

Figure 11:
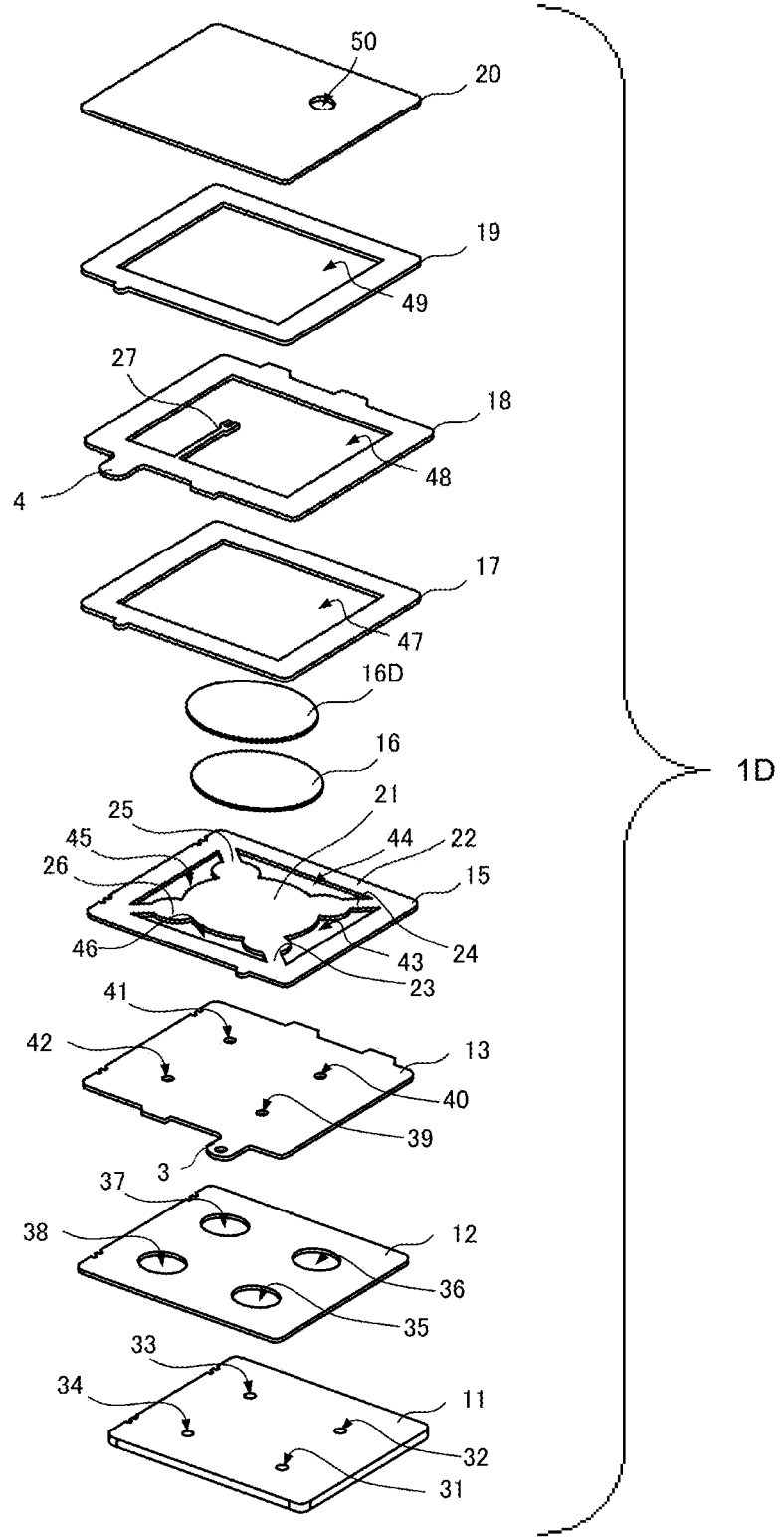

FIG. 11 is an exploded perspective view of a pump according to a fifth embodiment of the present disclosure.

Figure 12A:
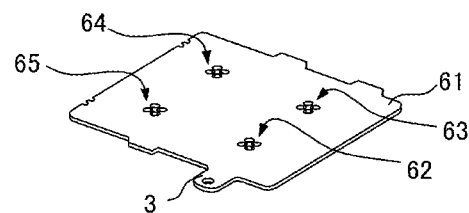
Figure 12B:
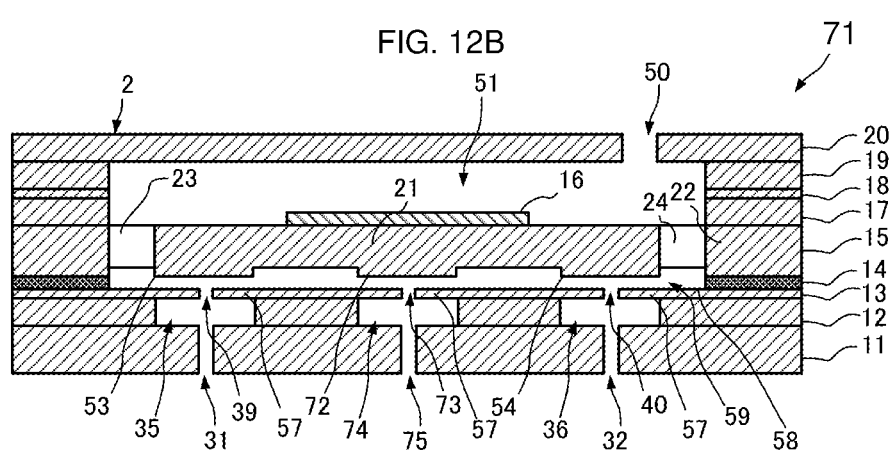
Figure 12C:
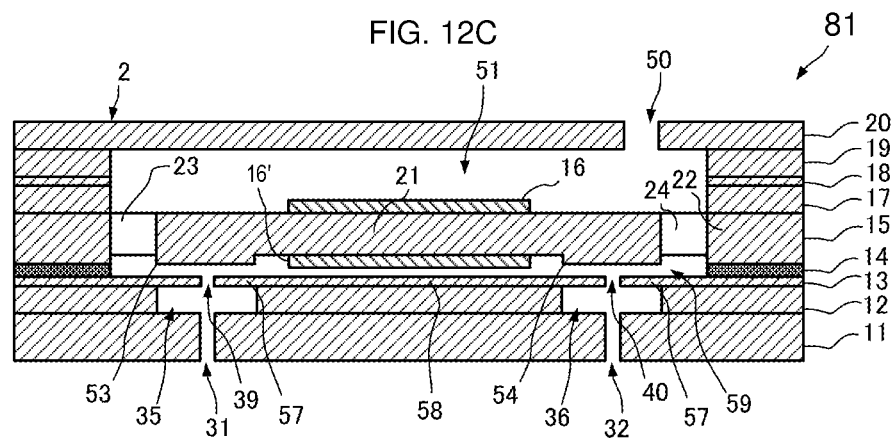

Each of FIGS. 12A-12C illustrates a pump according to sixth, seventh and eighth embodiments of the present disclosure.

Figure 13A:
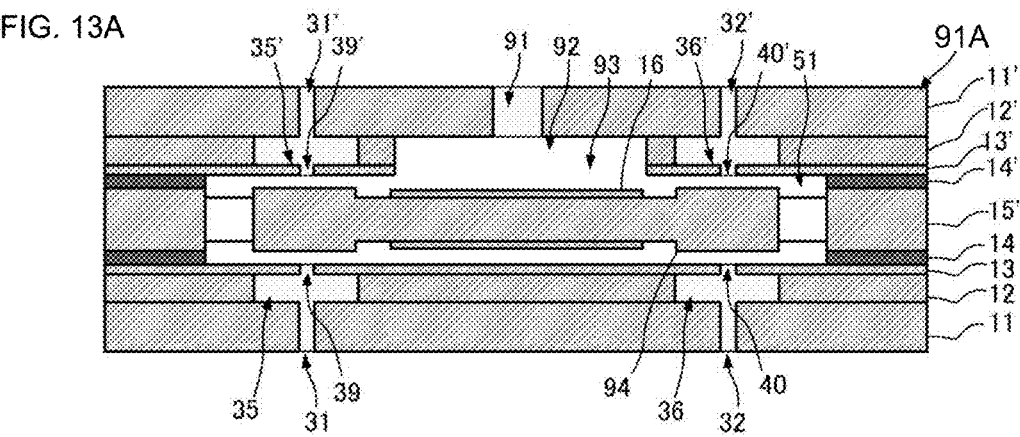
Figure 13B:
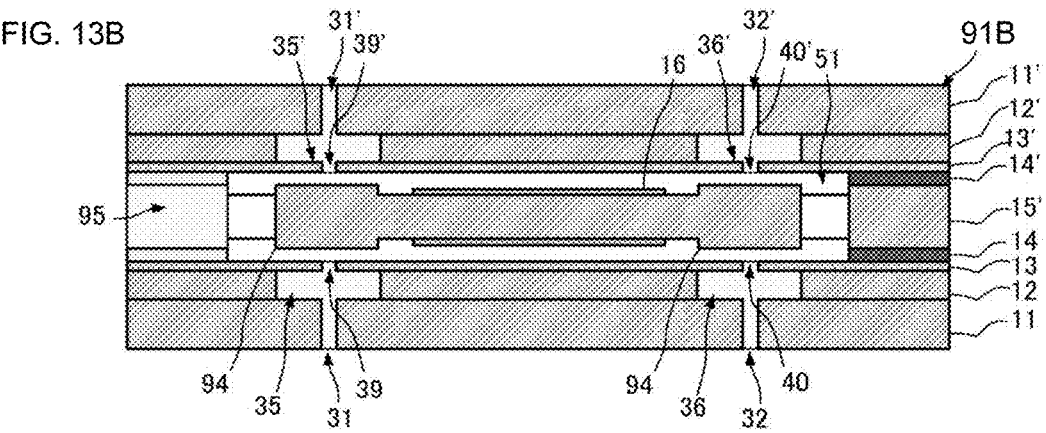
Figure 13C:
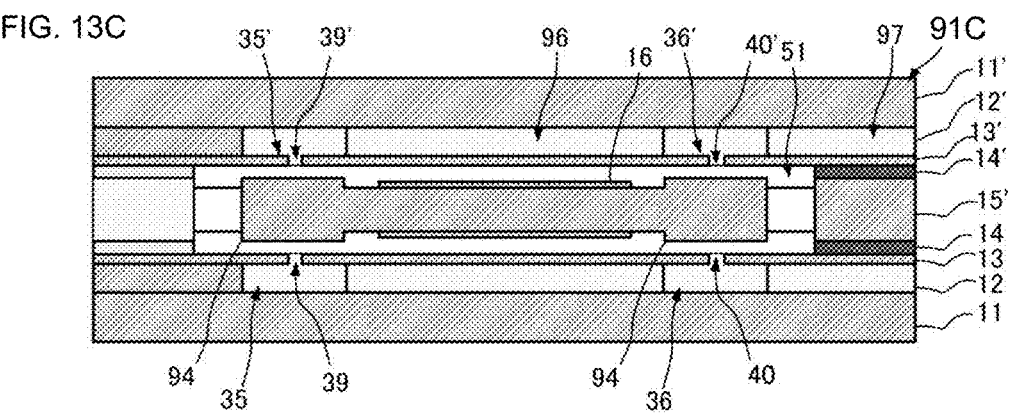

FIGS. 13A-13C illustrates a pump according to ninth, tenth and eleventh embodiments of the present disclosure.

Figure 14:
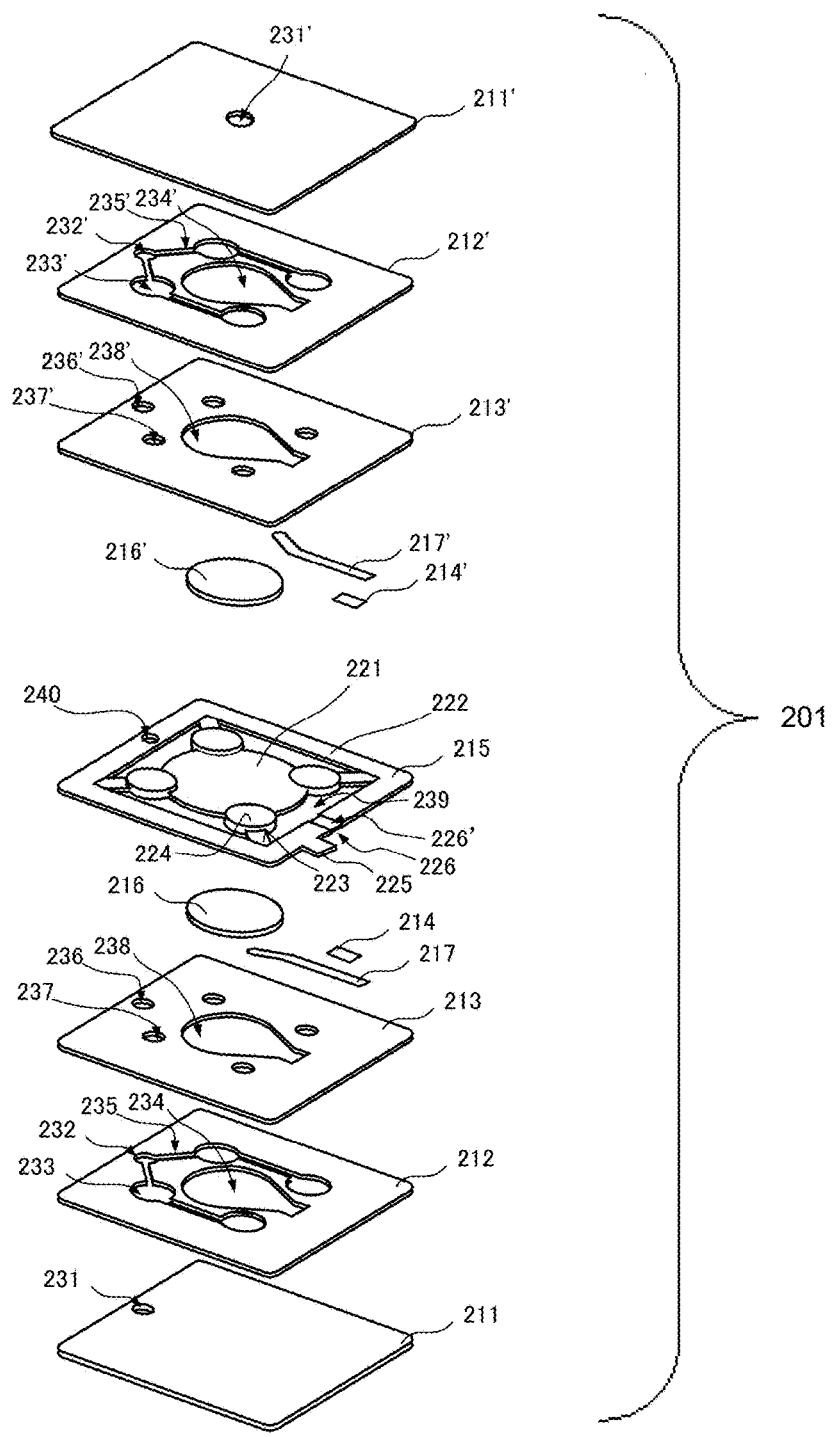

FIG. 14 is an exploded perspective view of a pump according to a twelfth embodiment of the present disclosure.

Figure 15A:
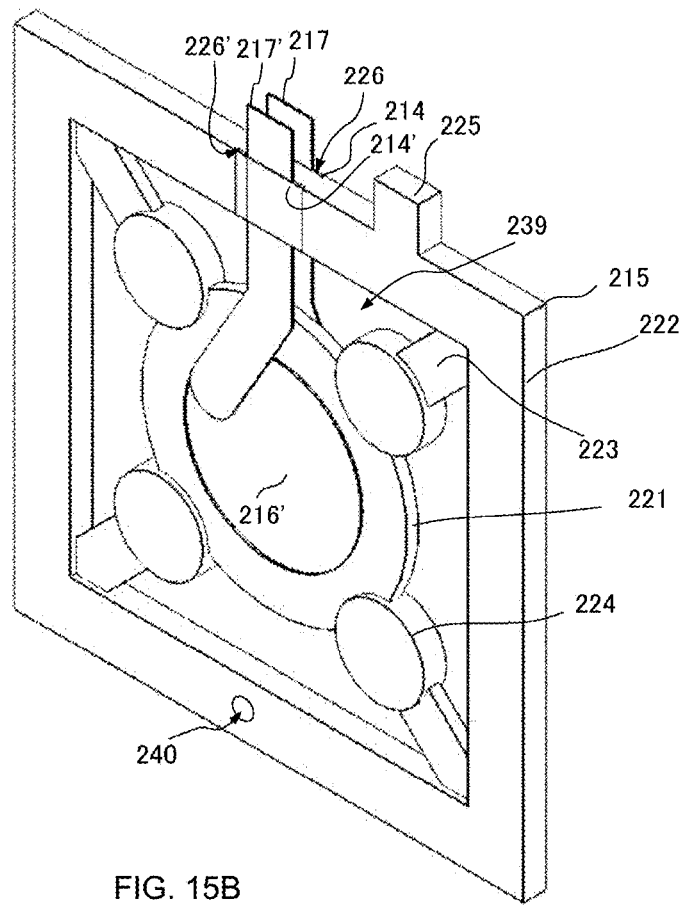
Figure 15B:
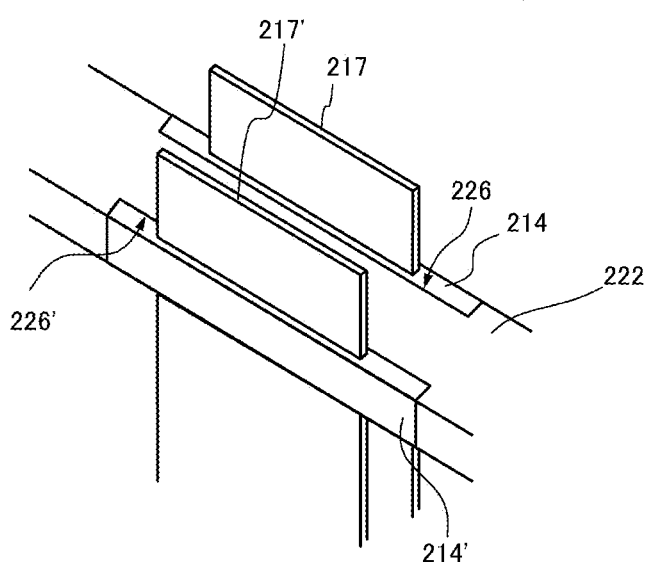

FIGS. 15A and 15B are an enlarged perspective view of the pump according to the twelfth embodiment of the present disclosure.

Figure 16:
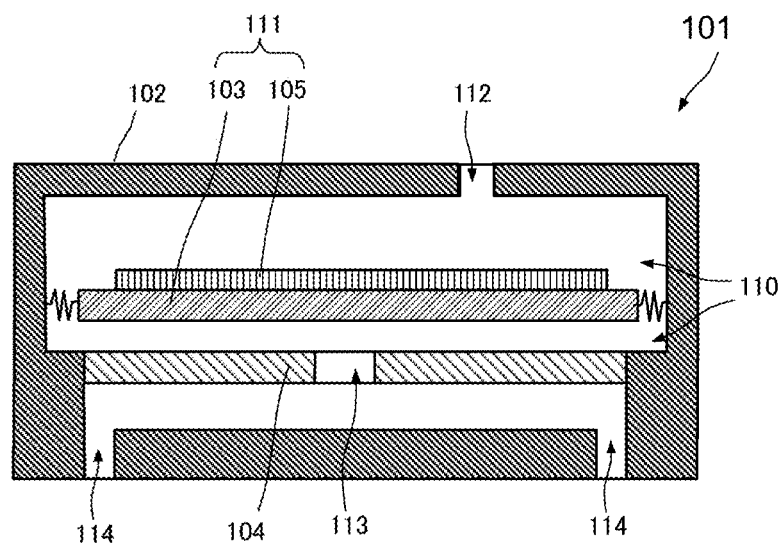

FIG. 16 illustrates major components of a conventional pump.

DETAILED DESCRIPTION OF THE DISCLOSURE

First Embodiment

Hereinafter, a pump 1 according to a first embodiment of the present disclosure will be described with reference to an air pump that sucks gas as an example.

Figure 1:
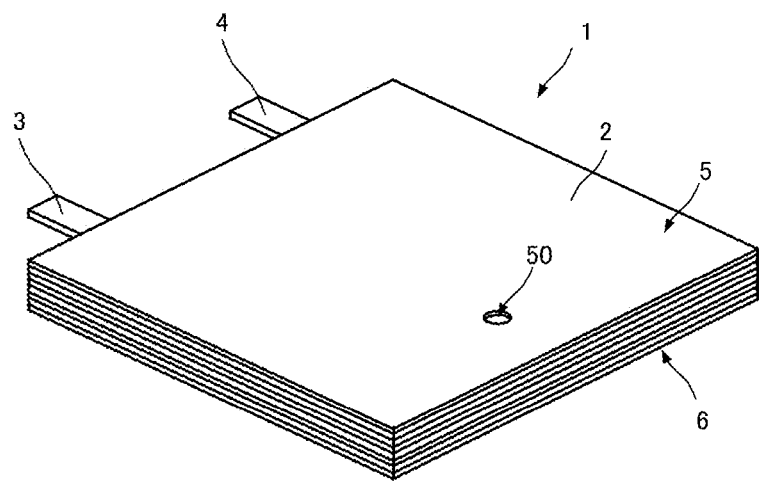
FIG. 1 is an external perspective view of a pump according to a first embodiment of the present disclosure.

FIG. 1 is an external perspective view of the pump 1. As illustrated in FIG. 1, the pump 1 includes a housing 2, and external connection terminals 3 and 4. The external connection terminals 3 and 4 are each connected to an external power source, and applied with an alternating-current drive signal. The housing 2, which has a principal face (upper principal face) 5 and a principal face (lower principal face) 6, is a hexahedron with a small thickness between the principal faces 5 and 6. The housing 2 also has a channel hole 50 provided at the upper principal face 5, and channel holes 31, 32, 33, and 34 (see FIG. 2) provided at the lower principal face 6.

Figure 2:
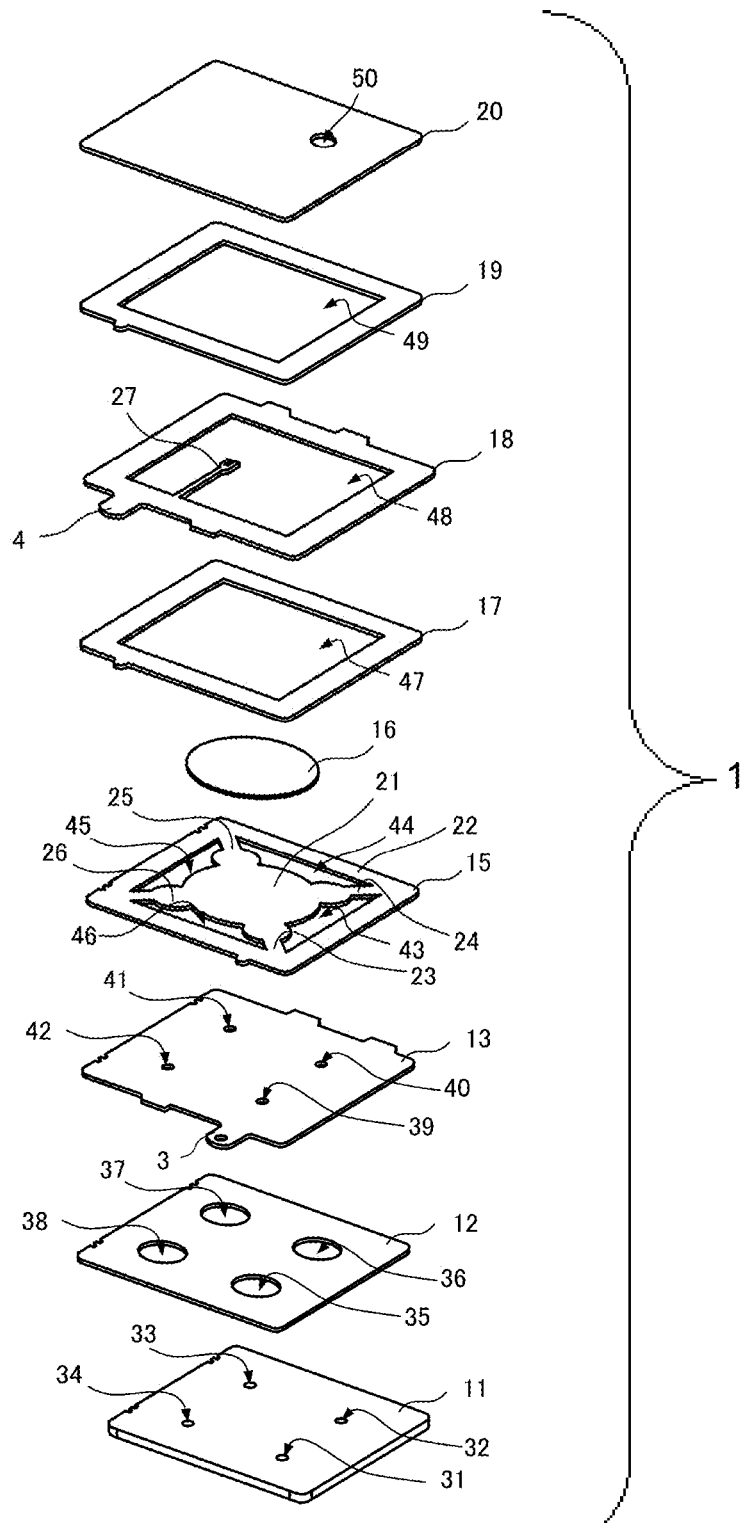
FIG. 2 is an exploded perspective view of the pump according to the first embodiment of the present disclosure.

FIG. 2 is an exploded perspective view of the pump 1. As illustrated in FIG. 2, the pump 1 includes the following components stacked in the order stated below: a cover plate 11, a channel plate 12, an opposed plate 13, an adhesion layer 14 (see FIG. 4), a vibrating plate 15, a piezoelectric element 16, an insulating plate 17, a power feeding plate 18, a spacer plate 19, and a lid plate 20.

The cover plate 11, which is exposed at the lower principal face 6 of the housing 2, is stuck on the lower face of the channel plate 12 by using adhesive (not illustrated) or other materials. The cover plate 11 has the channel holes 31, 32, 33, and 34 provided at the lower principal face 6 of the housing 2. The channel holes 31, 32, 33, and 34 have a circular shape. In the first embodiment, the channel holes 31, 32, 33, and 34 are inlets for sucking gas from the external space.

The channel plate 12 is stacked between the cover plate 11 and the opposed plate 13. The channel plate 12 is stuck on the upper face of the cover plate 11 and the lower face of the opposed plate 13 by using adhesive (not illustrated) or other materials. The channel plate 12 has openings 35, 36, 37, and 38 provided at its upper and lower faces. The openings 35, 36, 37, and 38 have a circular shape with a diameter larger than the diameter of the channel holes 31, 32, 33, and 34 of the cover plate 11. The openings 35, 36, 37, and 38 respectively communicate with the channel holes 31, 32, 33, and 34 of the cover plate 11.

The opposed plate 13 is stacked between the channel plate 12 and the vibrating plate 15. The opposed plate 13 is stuck on the upper face of the channel plate 12 by using adhesive (not illustrated) or other materials, and is stuck on the lower face of the vibrating plate 15 by using the adhesion layer 14 (see FIG. 4). The opposed plate 13 is made of metal, and includes the external connection terminal 3 that projects outward. The opposed plate 13 also has channel holes 39, 40, 41, and 42 at its upper and lower faces. The channel holes 39, 40, 41, and 42 have a circular shape with a diameter smaller that the diameter of the openings 35, 36, 37, and 38 of the channel plate 12. The channel holes 39, 40, 41, and 42 respectively communicate with the openings 35, 36, 37, and 38 of the channel plate 12, and also communicate with a pump chamber 51 (see FIG. 4) described later.

The adhesion layer 14 (see FIG. 4), which is stacked between the opposed plate 13 and the vibrating plate 15, is bonded to the upper face of the opposed plate 13 and the lower face of the vibrating plate 15. The adhesion layer 14 is formed in a frame-like shape so as to be overlapped with a frame part 22 of the vibrating plate 15. The space inside the frame-like shape of the adhesion layer 14 constitutes a part of the pump chamber 51 (see FIG. 4). The adhesion layer 14 includes a plurality of electrically conductive particles contained in a thermosetting resin such as an epoxy resin. The electrically conductive particles are made of, for example, silica or resin coated with an electrically conductive metal. Since the adhesion layer 14 contains a plurality of electrically conductive particles as mentioned above, the thickness of the adhesion layer 14 around its entire circumference can be made substantially equal to the particle diameter of the electrically conductive particles and thus uniform. Accordingly, the presence of the adhesion layer 14 allows the opposed plate 13 and the vibrating plate 15 to be positioned facing each other with a uniform spacing between the opposed plate 13 and the vibrating plate 15. Further, the opposed plate 13 and the vibrating plate 15 can be made electrically continuous by using the electrically conductive particles present in the adhesion layer 14.

The vibrating plate 15, which is made of a metal, for example, SUS430, is stacked between the opposed plate 13 and the insulating plate 17. The vibrating plate 15 includes a central part 21, the frame part 22, and connecting parts 23, 24, 25, and 26. The central part 21 has a circular shape in plan view. The frame part 22, which has a rectangular frame-like shape with an opening in plan view, surrounds the periphery of the vibrating plate 15. Each of the connecting parts 23, 24, 25, and 26 is in the form of a beam connecting between the central part 21 and the frame part 22. The frame part 22 is stuck on the upper face of the opposed plate 13 by using the adhesion layer 14 (see FIG. 4), and stuck on the lower face of the insulating plate 17 by using adhesive (not illustrated) or other materials. The vibrating plate 15 has openings 43, 44, 45, and 46 surrounded by the central part 21, the frame part 22, and the connecting parts 23, 24, 25, and 26. The openings 43, 44, 45, and 46 constitute a part of the pump chamber 51 (see FIG. 4).

The vibrating plate 15 may be made of a material other than SUS430, for example, an iron alloy such as SUS301, SUS304, or SUS631, a copper alloy such as phosphor bronze, beryllium bronze, or a copper-titanium alloy, an aluminum alloy, a nickel alloy, carbon, an amorphous metal, or resin.

The piezoelectric element 16, which has an electrode provided on each of the upper and lower faces of a sheet made of a piezoelectric material, corresponds to the "driver" according to the present disclosure. The piezoelectric element 16 exhibits piezoelectricity such that the piezoelectric element 16 increases or decreases in area when subjected to an electric field applied in the thickness direction. Using the piezoelectric element 16 as a driver allows the thickness of the driver to be reduced, enabling miniaturization of a fluid control part 59 and the pump 1 described later. The piezoelectric element 16, which is disc-shaped, is stuck on the upper face of the central part 21 of the vibrating plate 15 by using adhesive (not illustrated) or other materials. The electrode on the lower face of the piezoelectric element 16 is electrically connected to the external connection terminal 3, via the vibrating plate 15, the adhesion layer 14, and the opposed plate 13. The electrode on the lower face of the piezoelectric element 16 may not be provided but may be substituted for by use of the vibrating plate 15 that is made of metal.

The piezoelectric element 16 is made of a piezoelectric material with a coefficient of linear expansion lower than that of the vibrating plate 15. The piezoelectric element 16 is bonded to the central part 21 by using a thermosetting adhesive. Thus, when thermosetting adhesive is heated and allowed to set, a compressive stress is allowed to remain in the piezoelectric element 16 under normal temperature environments. This makes the piezoelectric element 16 resistant to breakage. Suitable examples of the piezoelectric material of the piezoelectric element 16 include lead zirconate titanate (PZT)-based ceramics. PZT-based ceramics have a coefficient of linear expansion of substantially zero, which is sufficiently lower than that of the metallic material constituting the vibrating plate 15, such as SUS430 (which has a coefficient of linear expansion of approximately $10.4 \times 10^{-6} K^{-1}$).

The insulating plate 17, which is stacked between the vibrating plate 15 and the power feeding plate 18, is stuck on the upper face of the frame part 22 of the vibrating plate 15 and the lower face of the power feeding plate 18 by using adhesive (not illustrated) or other materials. The insulating plate 17 corresponds to the insulating layer according to the present disclosure. Other than using the insulating plate 17, the insulating layer may be formed by a method such as coating the surface of the vibrating plate 15 or the power feeding plate 18 with an insulating material, forming an oxide film on the surface of the vibrating plate 15 or the power feeding plate 18, or applying a coating of a mixture of an adhesive having insulating property and non-electrically conductive particles. Alternatively, a plurality of the above-mentioned components having insulating property may be combined to form the insulating layer. The insulating plate 17 has a rectangular frame-like shape with an opening 47 in plan view. The opening 47 constitutes a part of the pump chamber 51 (see FIG. 4). The insulating plate 17, which is made of insulating resin, provides electrical insulation between the power feeding plate 18 and the vibrating plate 15. The thickness of the insulating plate 17 is the same as or slightly larger than the thickness of the piezoelectric element 16.

The power feeding plate 18, which is stacked between the insulating plate 17 and the spacer plate 19, is stuck on the upper face of the insulating plate 17 and the lower face of the spacer plate 19 by using adhesive (not illustrated) or other materials. The power feeding plate 18 has a substantially rectangular frame-like shape with an opening 48 in plan view. The opening 48 constitutes a part of the pump chamber 51 (see FIG. 4). The power feeding plate 18, which is made of metal, includes an internal connection terminal 27 that projects into the opening 48, and the external connection terminal 4 that projects outward. The distal end of the internal connection terminal 27 is soldered to the electrode on the upper face of the piezoelectric element 16. The position of this soldering preferably corresponds to a node of vibration produced in the piezoelectric element 16. This reduces leakage of vibration from the piezoelectric element 16 to the internal connection terminal 27, allowing for improved driving efficiency. In one particularly preferred arrangement, for a concentric area corresponding to each node of vibration of the piezoelectric element 16, the internal connection terminal 27 extends all the way to its distal end portion in a direction tangential to the concentric area, and the distal end portion of the internal connection terminal 27 is connected to the piezoelectric element 16 at the point of tangency on the concentric area. This configuration further reduces leakage of vibration to the internal connection terminal 27, allowing for a further improvement in driving efficiency while preventing the internal connection terminal 27 from breaking owing to vibration.

The spacer plate 19, which is stacked between the power feeding plate 18 and the lid plate 20, is stuck on the upper face of the power feeding plate 18 and the lower face of the lid plate 20 by using adhesive (not illustrated) or other materials. The spacer plate 19, which is made of resin, has a substantially rectangular frame-like shape with an opening 49 in plan view. The opening 49 constitutes a part of the pump chamber 51 (see FIG. 4). The spacer plate 19 is provided to prevent the soldered portion of the internal connection terminal 27 from coming into contact with the lid plate 20 when vibration occurs. If the upper face of the piezoelectric element 16 comes too close to the lid plate 20, the amplitude of vibration decreases owing to air resistance. Accordingly, the spacer plate 19 preferably has a thickness substantially equal to or greater than the thickness of the piezoelectric element 16.

The lid plate 20 is stacked over the spacer plate 19 such that the lid plate 20 is exposed at the upper principal face 5 of the housing 2. The lid plate 20 is stuck on the upper face of the spacer plate 19 by using adhesive (not illustrated) or other materials. The lid plate 20 closes the top side of the pump chamber 51 (see FIG. 4), and is positioned facing the vibrating plate 15 with a spacing therebetween. The lid plate 20 has the channel hole 50 at the upper principal face 5 of the housing 2. The channel hole 50 has a circular shape in plan view. The channel hole 50 communicates with the external space, and also communicates with the opening 49 of the spacer plate 19, that is, the pump chamber 51. In the first embodiment, the channel hole 50 is an outlet for discharging gas to the external space. Although the channel hole 50 is located at a position away from the center of the lid plate 20 in this example, the channel hole 50 may be provided near the center of the lid plate 20.

FIG. 3A is a plan view of the vibrating plate 15 and the piezoelectric element 16 as seen from the top side. FIG. 3B is a plan view of the vibrating plate 15 as seen from the bottom side. FIG. 3C is a side view of the cross-section of the vibrating plate 15 and the piezoelectric element 16 taken along C-C' in FIG. 3A.

As described above, the vibrating plate 15 includes, in plan view, the central part 21, the frame part 22, and the connecting parts 23, 24, 25, and 26, and has the openings 43, 44, 45, and 46. The piezoelectric element 16 is in the form of a disc slightly smaller in diameter than the central part 21 of the vibrating plate 15 in plan view. The piezoelectric element 16 is stuck on the upper face of the central part 21.

The connecting parts 23, 24, 25, and 26 extend radially from the central part 21 along the diagonals of the frame part 22 having a rectangular frame-like shape. The connecting parts 23, 24, 25, and 26 respectively include striking parts 53, 54, 55, and 56. The striking parts 53, 54, 55, and 56 are respectively areas in the connecting parts 23, 24, 25, and 26 that are locally increased in width near the boundary adjacent to the central part 21. Each of the striking parts 53, 54, 55, and 56 has a circular shape that is smaller in diameter than the central part 21 in plan view. The thickness of the vibrating plate 15 is reduced in areas excluding the striking parts 53, 54, 55, and 56 and the frame part 22 by etching performed from the lower face of the vibrating plate 15, and the striking parts 53, 54, 55, and 56 and the frame part 22 are thicker than other areas. That is, the striking parts 53, 54, 55, and 56 and the frame part 22 are formed as projections that project further toward the bottom side than do other areas of the vibrating plate 15.

FIG. 4 is a side view of the cross-section of the pump 1 taken along X-X' in FIG. 3B.

The pump 1 includes a housing 52 and the fluid control part 59, with the pump chamber 51 provided inside the housing 52. The housing 52 includes the cover plate 11, the channel plate 12, a restraining part 58 of the opposed plate 13 that will be described later, the adhesion layer 14, the frame part 22 of the vibrating plate 15, the insulating plate 17, the power feeding plate 18, the spacer plate 19, and the lid plate 20. The fluid control part 59 includes the piezoelectric element 16, the central part 21 and the connecting parts 23, 24, 25, and 26 of the vibrating plate 15, and a movable part 57 of the opposed plate 13 that will be described later. The fluid control part 59, which is provided inside the pump chamber 51 and vibrates to control fluid, corresponds to the "fluid control device" according to the present disclosure.

The opposed plate 13 has the channel holes 39 and 40 that are open to the pump chamber 51, at positions respectively facing substantially the center of the striking parts 53 and 54 of the connecting parts 23 and 24. Although not illustrated in the cross-sectional view of FIG. 4, the opposed plate 13 has the channel holes 41 and 42 (see FIG. 2) that are open to the pump chamber 51, at positions respectively facing substantially the center of the striking parts 55 and 56 (see FIG. 3) of the connecting parts 25 and 26. The striking parts 53, 54, 55, and 56 have a diameter larger than the diameter of the channel holes 39, 40, 41, and 42.

The areas near the channel holes 39 and 40 of the lower face of the opposed plate 13 are respectively exposed at the openings 35 and 36 of the channel plate 12. Although not illustrated in the cross-sectional view of FIG. 4, the areas near the channel holes 41 and 42 (see FIG. 2) of the lower face of the opposed plate 13 are also respectively exposed at the openings 37 and 38 (see FIG. 2) of the channel plate 12. The lower face of the opposed plate 13 is secured to the channel plate 12 except in areas near the channel holes 39, 40, 41, and 42. This configuration allows the areas of the opposed plate 13 near the channel holes 39, 40, 41, and 42 to serve as the movable part 57 that is capable of flexion without being restrained by the channel plate 12. This configuration also allows the portion of the lower face of the opposed plate 13 secured to the channel plate 12 to serve as the restraining part 58 that is incapable of flexion and restrains the areas around the movable part 57. The diameter of the movable part 57 and the diameter of the striking parts 53, 54, 55, and 56 are desirably relatively similar, but may not necessarily be the same. The opposed plate 13 and the channel plate 12 may be formed as a single plate member. In that case, the movable part 57 and the restraining part 58 may be formed by providing the plate member with a thin-walled portion of reduced thickness located near the channel holes 39, 40, 41, and 42, and a thick-walled portion of increased thickness surrounding the thin portion.

In the pump 1, application of an alternating-current driving signal to the external connection terminals 3 and 4 causes an alternating electric field to be applied in the thickness direction of the piezoelectric element 16. Then, as the piezoelectric element 16 attempts to expand and contract isotropically in the in-plane direction, flexural vibrations are generated concentrically in the thickness direction in the stack of the piezoelectric element 16 and the vibrating plate 15. Accordingly, in the first embodiment, the alternating-current driving signal applied to the external connection terminals 3 and 4 is set to a predetermined frequency so that flexural vibration is produced in the stack of the piezoelectric element 16 and the vibrating plate 15 in a higher-order resonant mode.

FIG. 5A schematically illustrates flexural vibration in a higher-order resonant mode generated in the stack of the piezoelectric element 16 and the vibrating plate 15. The following description will be directed to a third-order resonant mode.

In the pump 1, the stack of the piezoelectric element 16 and the vibrating plate 15 has a higher-order (and odd-order) resonant mode such that the frame part 22 becomes a node, the center of the central part 21 becomes a first antinode, and the center of each of the striking parts 53, 54, 55, and 56 becomes a second antinode. The frequency of the alternating-current driving signal is set so as to produce such a higher-order resonant mode. For example, in the third-order resonant mode, the first antinode and the second antinode differ in their vibration phase by 180 degrees. That is, when the piezoelectric element 16 expands, the center of the central part 21 of the vibrating plate 15 bends to become convex toward the piezoelectric element 16, and the striking parts 53, 54, 55, and 56 are displaced in the direction opposite to the piezoelectric element 16. When the piezoelectric element 16 contracts, the center of the central part 21 of the vibrating plate 15 bends to become concave toward the piezoelectric element 16, and the striking parts 53, 54, 55, and 56 are displaced toward the piezoelectric element 16.

FIG. 5B schematically illustrates how the areas near the striking part 53 and the movable part 57 vibrate.

When vibration occurs in a higher-order resonant mode, this causes the striking part 53 of the vibrating plate 15 to vibrate in such a way that the striking part 53 is repeatedly displaced upward and downward. The areas near the striking parts 54, 55, and 56 (see FIG. 3) are also subjected to vibration similar to that generated in the area near the striking part 53. The vibrations produced near the striking parts 53, 54, 55, and 56 are in synchronous phase with one another. Then, the striking parts 53, 54, 55, and 56 are repeatedly struck against a thin fluid layer that is present in the gap between the opposed plate 13 and the striking parts 53, 54, 55, and 56 inside the pump chamber 51. This causes repeated pressure fluctuations to occur in the fluid positioned facing the striking parts 53, 54, 55, and 56. The repeated pressure fluctuations are transmitted through the fluid to the movable part 57 positioned facing the striking parts 53, 54, 55, and 56. The movable part 57, which has its dimensions such as diameter and thickness designed to have a predetermined natural frequency, undergoes flexural vibration in response to the vibration of the striking parts 53, 54, 55, and 56.

As the vibration of the striking parts 53, 54, 55, and 56 and the vibration of the movable part 57 produced in this way become coupled, in the gap between the opposed plate 13 and the vibrating plate 15 inside the pump chamber 51, the fluid flows toward the outer periphery of the movable part 57 from the vicinity of the channel holes 39, 40, 41, and 42 located at the center of the movable part 57. This creates a negative pressure in the vicinity of the channel holes 39, 40, 41, and 42 inside the pump chamber 51, causing the fluid to be sucked into the pump chamber 51 from each of the channel holes 39, 40, 41, and 42. Inside the pump chamber 51, a positive pressure is created in the space located near the lid plate 20, and this positive pressure is released at the channel hole 50 provided in the lid plate 20. Consequently, the fluid sucked into the pump chamber 51 through each of the channel holes 39, 40, 41, and 42 exits the pump chamber 51 through the channel hole 50 provided in the lid plate 20.

In the pump 1 according to the first embodiment, the fluid is sucked into the pump chamber 51 through each of the four channel holes 39, 40, 41, and 42 in a parallel fashion. This allows for an increase in the total amount of fluid entering the pump chamber 51, thus enabling an improvement in the driving efficiency of the pump 1.

Further, the striking parts 53, 54, 55, and 56 with an increased width are provided inside the pump chamber 51, and the striking parts 53, 54, 55, and 56 are positioned facing the areas around the channel holes 39, 40, 41, and 42, which directly contribute to pump action, at a close distance. This configuration allows the amplitude of vibration of the striking parts 53, 54, 55, and 56 to be increased without decreasing the area of the fluid positioned facing the striking parts 53, 54, 55, and 56.

Further, the striking parts 53, 54, 55, and 56 in the form of projections are provided inside the pump chamber 51, and the striking parts 53, 54, 55, and 56 are positioned facing the areas around the channel holes 39, 40, 41, and 42, which directly contribute to pump action, at a close distance. This configuration allows the spacing between the vibrating plate 15 and the opposed plate 13 to be increased at positions that do not directly contribute to pump action. These features make it possible to reduce unwanted load on the piezoelectric element 16 and the vibrating plate 15, thus enabling improvements in features such as the pressure or flow rate of the fluid generated by pump action, and driving efficiency. Although the striking parts 53, 54, 55, and 56 are provided in the form of projections in the first embodiment, the striking parts 53, 54, 55, and 56 may be provided as flat areas with the same thickness as the thickness of the surrounding areas. In that case, the movable part 57 of the opposed plate 13 positioned facing the striking parts 53, 54, 55, and 56 may be provided so as to project toward the striking parts 53, 54, 55, and 56.

Preferably, the opposed plate 13, the channel plate 12, and the cover plate 11 are each made of a material with a coefficient of linear expansion higher than the coefficient of linear expansion of the vibrating plate 15, and bonded to the frame part 22 of the vibrating plate 15 by using a thermosetting adhesive. As a result, the opposed plate 13 can be bowed to become convex toward the vibrating plate 15 under normal temperature environments, thus imparting tension to the movable part 57. This tension makes the movable part 57 resistant to slacking. This makes it possible to prevent vibration from being inhibited by deflection or settling of the movable part 57.

Preferably, the lid plate 20, the spacer plate 19, the power feeding plate 18, the insulating plate 17, the vibrating plate 15, the opposed plate 13, the channel plate 12, and the cover plate 11 all have substantially equal coefficients of linear expansion. In particular, the lid plate 20, the vibrating plate 15, the opposed plate 13, the channel plate 12, and the cover plate 11 are preferably made of identical kinds of metals with equal or similar coefficients of linear expansion. This reduces variations in the tension on the movable part 57 resulting from a difference in coefficient of linear expansion, thus improving the temperature characteristics of the pump 1.

Now, a more detailed description will be given of how the movable part 57 and the striking parts 53, 54, 55, and 56 vibrate. The movable part 57 is designed to have a natural frequency corresponding to a frequency slightly lower than the driving frequency of the striking parts 53, 54, 55, and 56. As a result, the vibration produced in the movable part 57 in response to the vibration of the striking parts 53, 54, 55, and 56 has substantially the same frequency as the driving frequency of the striking parts 53, 54, 55, and 56, with a slight phase delay.

Further, the striking parts 53, 54, 55, and 56 have a small diameter in comparison to the distance from the center of the vibrating plate 15 to the center of the striking parts 53, 54, 55, and 56, that is, the distance from the first antinode to the second antinode. Thus, the striking parts 53, 54, 55, and 56 vibrate so as to undergo upward and downward displacement while keeping a relatively flat shape. By contrast, the movable part 57 is restrained at its outer periphery by the restraining part 58, and has a diameter substantially equal to the diameter of the striking parts 53, 54, 55, and 56. Thus, the movable part 57 vibrates so as to undergo large upward and downward flexion within the area where the movable part 57 is positioned facing each of the striking parts 53, 54, 55, and 56.

In this way, a standing-wave vibration that causes upward and downward displacement is produced in each of the striking parts 53, 54, 55, and 56, and a standing-wave vibration that causes upward and downward flexion is produced in the movable part 57. These standing-wave vibrations differ in their wave length and phase. Consequently, the spacing between the striking parts 53, 54, 55, and 56 and the movable part 57 represented as the difference between these standing-wave vibrations changes with time like a travelling wave travelling from the vicinity of the channel holes 39, 40, 41, and 42 toward the outer periphery of the movable part 57, because the two standing-wave vibrations differ in their wave length and phase. As a result, in the gap between the striking parts 53, 54, 55, and 56 and the movable part 57, the fluid is transferred so as to be squeezed out from the vicinity of the channel holes 39, 40, 41, and 42 toward the outer periphery of the movable part 57. This allows the direction of fluid flow to be set even without the presence of a component such as a check valve in the pump 1, thus facilitating fluid flow. In this respect as well, unwanted load on the piezoelectric element 16 and the vibrating plate 15 can be reduced to enable improvements in features such as the pressure or flow rate of fluid created by pump action, and driving efficiency.

As discussed above, the pump 1 according to the first embodiment allows driving efficiency to be improved without an increase in its physical size. Alternatively, the pump 1 allows its physical size to be reduced without a decrease in driving efficiency.

Second Embodiment

Next, a pump 1A according to a second embodiment of the present disclosure will be described with reference to an air pump that sucks gas as an example.

FIG. 6 is an exploded perspective view of the pump 1A. The pump 1A includes the following components stacked in the order stated below: a cover plate 11A, a channel plate 12A, an opposed plate 13A, the adhesion layer 14 (not illustrated), the vibrating plate 15, the piezoelectric element 16, a metal plate 17A, the insulating plate 17, the power feeding plate 18, the spacer plate 19, and the lid plate 20. The adhesion layer 14 (not illustrated), the vibrating plate 15, the piezoelectric element 16, the insulating plate 17, the power feeding plate 18, the spacer plate 19, and the lid plate 20 are of substantially the same configuration as those in the first embodiment. The side wall surface of each of the vibrating plate 15, the insulating plate 17, the power feeding plate 18, and the spacer plate 19 that faces the pump chamber described later can be made to have any suitable shape. In this example, the side wall surface has such a shape that the side wall surface extends along the side wall of each of the central part 21 and the connecting parts 23, 24, 25, and 26 of the vibrating plate 15 with a predetermined spacing therebetween.

In the second embodiment, the metal plate 17A is stacked between the vibrating plate 15 and the insulating plate 17. The metal plate 17A is made of a hard metallic material with a density and a Young's modulus greater than those of the insulating plate 17. Providing the metal plate 17A having such characteristics allows the vibrating plate 15 to be secured in place with increased reliability in comparison to when the insulating plate 17 is directly joined to the vibrating plate 15. In other words, providing the metal plate 17A makes it possible to reduce leakage of the vibration of the vibrating plate 15 to other components, in comparison to when the insulating plate 17 is directly joined to the vibrating plate 15. This allows the amplitude of vibration of the vibrating plate 15 to be increased, thus enabling an improvement in the driving efficiency of the pump 1A.

In the second embodiment, the cover plate 11A has channel holes 31A, 32A, 33A, and 34A. The channel plate 12A has channels 35A, 36A, 37A, and 38A. The opposed plate 13A has openings 39A, 40A, 41A, and 42A in addition to the channel holes 39, 40, 41, and 42.

Figure 7A:
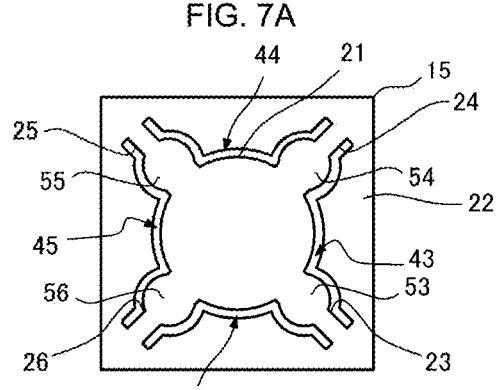
Figure 7B:
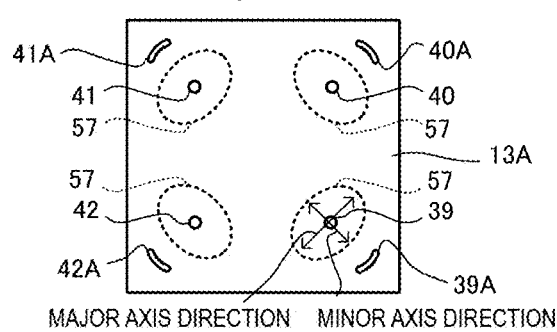
Figure 7C:
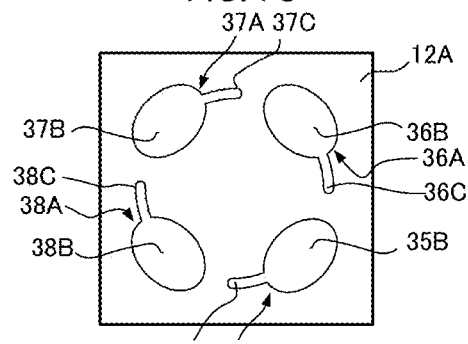
Figure 7D:
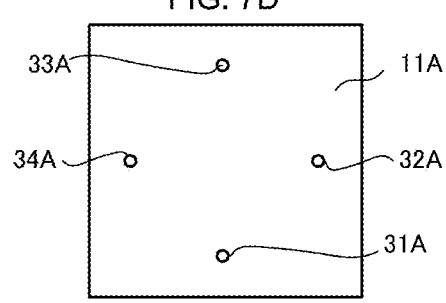

FIG. 7A is a plan view of the vibrating plate 15. FIG. 7B is a plan view of the opposed plate 13A. FIG. 7C is a plan view of the channel plate 12A. FIG. 7D is a plan view of the cover plate 11A.

The openings 39A, 40A, 41A, and 42A of the opposed plate 13A illustrated in FIG. 7B are provided to prevent the adhesive of the adhesion layer 14 (not illustrated) from flowing out toward the connecting parts 23, 24, 25, and 26 from the frame part 22 of the vibrating plate 15 illustrated in FIG. 7A. Accordingly, the openings 39A, 40A, 41A, and 42A are respectively provided so as to extend along the joints between the frame part 22 and the connecting parts 23, 24, 25, and 26. In other words, the openings 39A, 40A, 41A, and 42A are provided so as to extend along the outer periphery of the movable part 57. Providing the openings 39A, 40A, 41A, and 42A in this way makes it possible to prevent the adhesive of the adhesion layer 14 (not illustrated) from flowing out toward and becoming firmly fixed on the connecting parts 23, 24, 25, and 26. This prevents problems such as the adhesive of the adhesion layer 14 (not illustrated) becoming firmly fixed on the connecting parts 23, 24, 25, and 26 and inhibiting vibration of the connecting parts 23, 24, 25, and 26. As a result, the vibrating plate 15 is vibrated in a more stable manner, thus preventing variations in the performance of the pump 1A. Not only the opposed plate 13A but also the channel plate 12A may be provided with openings having the same shape as that of the openings 39A, 40A, 41A, and 42A and used for preventing outflow of adhesive. Outflow of adhesive toward the connecting parts 23, 24, 25, and 26 can be also reduced by forming the vibrating plate 15 thinner in areas other than the striking parts 53, 54, 55, and 56 and the frame part 22 through etching performed from the lower face of the vibrating plate 15, and forming the vibrating plate 15 thicker in the striking parts 53, 54, 55, and 56 and the frame part 22 than in other areas.

The channels 35A, 36A, 37A, and 38A of the channel plate 12A respectively have openings 35B, 36B, 37B, and 38B and extensions 35C, 36C, 37C, and 38C.

The openings 35B, 36B, 37B, and 38B, each of which has an elliptical shape in plan view, are respectively positioned facing the channel holes 39, 40, 41, and 42 of the opposed plate 13A and their surrounding areas. In plan view, the extensions 35C, 36C, 37C, and 38C are extended from the openings 35B, 36B, 37B, and 38B in the circumferential direction of the central part 21 of the vibrating plate 15. The extensions 35C, 36C, 37C, and 38C respectively communicate with the channel holes 31A, 32A, 33A, and 34A of the cover plate 11A described later, in the vicinity of their end portions distal from the openings 35B, 36B, 37B, and 38B. Thus, the cover plate 11A and the channel plate 12A each correspond to the channel part defined in the claims. Providing the extensions 35C, 36C, 37C, and 38C in the channel plate 12A in this way allows the channel holes 39, 40, 41, and 42 of the opposed plate 13A and the channel holes 31A, 32A, 33A, and 34A of the cover plate 11A to be respectively located at positions away from each other in plan view. This reduces leakage of the vibrating sound generated by vibration of the vibrating plate 15 from the channel holes 31A, 32A, 33A, and 34A of the cover plate 11A through areas such as the channel holes 39, 40, 41, and 42 of the opposed plate 13A and the channels 35A, 36A, 37A, and 38A of the channel plate 12A. This enables low-noise construction of the pump 1A.

With respect to the direction of the radius extending toward the outer side portion from the central part 21 of the vibrating plate 15, the openings 35B, 36B, 37B, and 38B are substantially the same or slightly larger in dimension than the striking parts 53, 54, 55, and 56 of the vibrating plate 15. Further, with respect to the circumferential direction around the central part 21, the openings 35B, 36B, 37B, and 38B are respectively sufficiently larger in dimension than the striking parts 53, 54, 55, and 56 of the vibrating plate 15. That is, the openings 35B, 36B, 37B, and 38B each have a minor axis extending in the radial direction of the central part 21, and a major axis extending in the circumferential direction of the central part 21. Since the areas in the opposed plate 13A positioned facing the openings 35B, 36B, 37B, and 38B serve as the movable part 57, the movable part 57 of the opposed plate 13A also has an elliptical shape with a minor axis extending in the radial direction of the central part 21 and a major axis extending in the circumferential direction of the central part 21.

FIG. 8 is a side cross-sectional drawing as viewed in the direction of the minor axis of the movable part 57, schematically illustrating how the movable part 57 and the striking part 53 vibrate. The striking parts 54, 55, and 56 of the vibrating plate 15 and the movable part 57 positioned facing the striking parts 54, 55, and 56 also exhibit a similar manner of vibration.

FIG. 8A illustrates the same configuration as that of the first embodiment, that is, a configuration in which the movable part 57 has substantially the same diameter as the diameter of the striking part 53. FIG. 8B illustrates the same configuration as that of the second embodiment, that is, a configuration in which the movable part 57 has a diameter sufficiently larger than the diameter of the striking part 53 with respect to the major axis direction.

As described above with reference to the first embodiment, the antinodes of flexural vibration are produced concentrically in plan view in the central part 21 of the vibrating plate 15. Thus, in the striking part 53, antinodes are produced uniformly in the circumferential direction of the central part 21 (the major axis direction of the movable part 57).

Consequently, the striking part 53 moves up and down as viewed in cross-section taken in the radial direction of the central part 21 (the minor axis direction of the movable part 57). As the striking part 53 moves up and down in this way, at positions inside the striking part 53 near its both principal faces, the striking part 53 undergoes expansion in the radial direction of the central part 21 (the minor axis direction of the movable part 57) in areas near one principal face, and contraction in the radial direction of the central part 21 (the minor axis direction of the movable part 57) in areas near the other principal face. Such expansion or contraction occurring locally within the striking part 53 produces an opposite contraction or expansion in a direction orthogonal to this expansion or contraction. That is, expansion occurring locally within the striking part 53 in a predetermined direction (the minor axis direction of the movable part 57) creates contraction in a direction (the major axis direction of the movable part 57) orthogonal to the direction of the expansion. Further, contraction occurring locally within the striking part 53 in a predetermined direction (the minor axis direction of the movable part 57) creates expansion in a direction (the major axis direction of the movable part 57) orthogonal to the direction of the contraction. This causes the striking part 53 to undergo flexural vibration as viewed in the minor axis direction of the movable part 57.

This vibration has maximum amplitude in the vicinity of each end of the striking part 53, as viewed in the cross-section of the striking part 53 taken in the radial direction of the central part 21 (the minor axis direction of the movable part 57). Thus, if the amplitude of vibration in the vicinity of each end of the striking part 53 is increased excessively such as by increasing the driving voltage applied, as illustrated in FIG. 8A, there is a risk that the movable part 57 positioned facing the striking part 53, and each end portion of the striking part 53 may approach and collide with each other.

Accordingly, in the second embodiment, the movable part 57 of the opposed plate 13A is formed in an oval shape, thus allowing the movable part 57 to be increased in dimension in the major axis direction while minimizing a decrease in the natural frequency of the movable part 57. This allows the amplitude of vibration of the movable part 57 to be increased at a position facing each end portion in the major axis direction of the striking part 53 as illustrated in FIG. 8B. This makes it possible to reduce the risk of collision of the movable part 57 with each end portion of the striking part 53 positioned facing the movable part 57. Therefore, the pump 1A makes it possible to prevent problems such as generation of abnormal vibration or noise and reduction of pressure resulting from collision between the movable part 57 and the striking part 53.

As described above, the movable part 57 of the opposed plate 13A desirably have such a shape that its major axis extends in the circumferential direction of the central part 21 (the direction in which antinodes are uniformly produced in the striking parts 53, 53, 55, and 56). Suitable examples of the specific planar shape of the movable part 57 include an oval in addition to an ellipse.

Third Embodiment

Next, a pump 1B according to a third embodiment of the present disclosure will be described with reference to an air pump that sucks gas as an example.

FIG. 9 is an exploded perspective view of the pump 1B. The pump 1B includes the cover plate 11, the channel plate 12, the opposed plate 13, the adhesion layer 14 (not illustrated), the vibrating plate 15, the piezoelectric element 16, the insulating plate 17, the power feeding plate 18, the spacer plate 19, the lid plate 20, and a stacking plate 16B.

The stacking plate 16B is further stacked for the stack of the vibrating plate 15 and the piezoelectric element 16. In the third embodiment, the stacking plate 16B is stacked between the vibrating plate 15 and the piezoelectric element 16. The stacking plate 16B has substantially the same disc-like outer shape as that of the piezoelectric element 16, and has dimensions that are the same as or slightly larger than those of the piezoelectric element 16 in plan view.

As in the first embodiment, the piezoelectric element 16 is made of, for example, PZT-based ceramic with a coefficient of linear expansion of substantially zero. The vibrating plate 15 is also made of, for example, SUS430 with a coefficient of linear expansion of approximately $10.4 \times 10^{-6} K^{-1}$ as in the first embodiment. The vibrating plate 15 and the piezoelectric element 16 are thus made of different materials, and differ in their coefficient of linear expansion.

This means that in the case of a configuration in which the vibrating plate 15 and the piezoelectric element 16 are directly stuck together and stacked as in the first embodiment or second embodiment, unwanted deformation resulting from temperature fluctuations occurs in the stack. Generally speaking, the stack of the vibrating plate 15 and the piezoelectric element 16 undergoes a deflection such that when subjected to higher temperatures, the stack becomes more concave in its side near the piezoelectric element 16 having the lower coefficient of linear expansion, and when subjected to lower temperatures, the stack becomes more convex in its side near the piezoelectric element 16 having the lower coefficient of linear expansion. If such deformation resulting from the difference in coefficient of linear expansion occurs in the stack of the vibrating plate 15 and the piezoelectric element 16, this causes, for example, the spacing and parallelism between the vibrating plate 15 (the striking parts 53 to 56) and the opposed plate 13 to change with temperature. Consequently, depending on conditions such as the setting of the dimensions of various parts or the design of the materials of various parts, characteristics such as fluid pressure distribution and fluid pressure fluctuations in the fluid layer sandwiched between the vibrating plate 15 and the opposed plate 13 become affected by temperature, causing excessive fluctuations in the flow rate of the pump due to temperature.

Accordingly, in the third embodiment, the stack of the vibrating plate 15 and the piezoelectric element 16 is further provided with the stacking plate 16B, thus compensating for thermal deformation resulting from the difference in coefficient of linear expansion between the vibrating plate 15 and the piezoelectric element 16. As the stacking plate 16B, a stacking plate with a coefficient of linear expansion and a thickness that satisfy a predetermined relationship with respect to the coefficients of linear expansion of the vibrating plate 15 and the piezoelectric element 16 is disposed at a suitable position.

Specifically, the stacking plate 16B is stacked between the piezoelectric element 16 and the vibrating plate 15, and the coefficient of linear expansion of the stacking plate 16B is set to a value equal to or higher than the coefficient of linear expansion of each of the piezoelectric element 16 and the vibrating plate 15, or a value equal to or lower than the coefficient of linear expansion of each of the piezoelectric element 16 and the vibrating plate 15. When bonding is performed at high temperatures, compressive stress is applied to the piezoelectric element 16. Accordingly, it is desirable to set the coefficient of linear expansion of the stacking plate 16B equal to or higher than the coefficient of linear expansion of each of the piezoelectric element 16 and the vibrating plate 15.

With the stacking plate 16B set in this way, the deformation (stress) resulting from the difference in coefficient of linear expansion between the vibrating plate 15 and the stacking plate 16B, and the deformation (stress) resulting from the difference in coefficient of linear expansion between the piezoelectric element 16 and the stacking plate 16B can be cancelled out by each other. As a result, deformation occurring in the stack of the stacking plate 16B, the piezoelectric element 16, and the vibrating plate 15 due to the difference in coefficient of linear expansion can be reduced in comparison to when the vibrating plate 15 and the piezoelectric element 16 are directly stuck together. Therefore, temperature-induced fluctuations in characteristics such as the spacing and parallelism between the striking parts 53 to 56 provided in the vibrating plate 15 and the opposed plate 13 can be reduced, and temperature-induced fluctuations in the flow rate generated by vibration of the striking parts 53 to 56 can be also reduced.

The stacking plate 16B may be made of any suitable material whose coefficient of linear expansion satisfies the above-mentioned relationship. Examples of the suitable material that may be used include materials with coefficients of linear expansion higher than that of SUS430, and materials with coefficients of linear expansion lower than that of PZT-based ceramics.

Even if a material with a coefficient of linear expansion lower than that of the piezoelectric element 16 is used for the vibrating plate 15, the coefficient of linear expansion of the stacking plate 16B is preferably set in the manner as mentioned above. That is, it is preferable to set the coefficient of linear expansion of the stacking plate 16B to a value equal to or higher than the coefficient of linear expansion of each of the piezoelectric element 16 and the vibrating plate 15, or a value equal to or lower than the coefficient of linear expansion of each of the piezoelectric element 16 and the vibrating plate 15. In this case as well, the deformation (stress) resulting from the difference in coefficient of linear expansion between the vibrating plate 15 and the stacking plate 16B, and the deformation (stress) resulting from the difference in coefficient of linear expansion between the piezoelectric element 16 and the stacking plate 16B can be cancelled out by each other. As already described, this makes it possible to reduce deformation occurring in the stack of the stacking plate 16B, the piezoelectric element 16, and the vibrating plate 15 resulting from the difference in coefficient of linear expansion, in comparison to when the vibrating plate 15 and the piezoelectric element 16 are directly stuck together.

Fourth Embodiment

Next, a pump 1C according to a fourth embodiment of the present disclosure will be described.

FIG. 10 is an exploded perspective view of the pump 1C according to the fourth embodiment of the present disclosure.

The pump 1C, which corresponds to a modification of the third embodiment mentioned above, includes a stacking plate 16C. As in the third embodiment mentioned above, the stacking plate 16C is further stacked for the stack of the vibrating plate 15 and the piezoelectric element 16. The stacking plate 16C used, which is disposed at a suitable position, is a stacking plate that has substantially the same disc-like outer shape as that of the piezoelectric element 16, has dimensions that are the same as or slightly larger than those of the piezoelectric element 16 in plan view, and has a coefficient of linear expansion and a thickness that satisfy a predetermined relationship with respect to the vibrating plate 15 and the piezoelectric element 16.

In the fourth embodiment, the stacking plate 16C is stacked not between the vibrating plate 15 and the piezoelectric element 16 but over the principal face of the vibrating plate 15 located opposite to the side where the piezoelectric element 16 is stacked. Further, the coefficient of linear expansion of the stacking plate 16C is set to a value lower than the coefficient of linear expansion of the vibrating plate 15 and substantially equal to the coefficient of linear expansion of the piezoelectric element 16.

As already mentioned, with the stacking plate 16C set in this way, the deformation (stress) resulting from the difference in coefficient of linear expansion between the vibrating plate 15 and the stacking plate 16C, and the deformation (stress) resulting from the difference in coefficient of linear expansion between the vibrating plate 15 and the piezoelectric element 16 can be cancelled out by each other. As a result, deformation occurring in the stack of the stacking plate 16C, the piezoelectric element 16, and the vibrating plate 15 due to the difference in coefficient of linear expansion can be reduced in comparison to when the vibrating plate 15 and the piezoelectric element 16 are directly stuck together. Therefore, temperature-induced fluctuations in characteristics such as the spacing and parallelism between the striking parts 53 to 56 provided in the vibrating plate 15 and the opposed plate 13 can be reduced, and temperature-induced fluctuations in the flow rate generated by vibration of the striking parts 53 to 56 can be also reduced.

The stacking plate 16C may be made of any suitable material whose coefficient of linear expansion satisfies the above-mentioned relationship. Examples of the suitable material that may be used include metallic materials with coefficients of linear expansion higher than that of SUS430, and resin materials.

Now, suppose that a material with a coefficient of linear expansion lower than that of the piezoelectric element 16 is used for the vibrating plate 15. In this case, the coefficient of linear expansion of the stacking plate 16C is preferably set in a manner opposite to that mentioned above. That is, the coefficient of linear expansion of the stacking plate 16C may be set higher than the coefficient of linear expansion of the vibrating plate 15. In this case as well, the deformation (stress) resulting from the difference in coefficient of linear expansion between the vibrating plate 15 and the stacking plate 16C, and the deformation (stress) resulting from the difference in coefficient of linear expansion between the vibrating plate 15 and the piezoelectric element 16 can be cancelled out by each other. As already mentioned, this makes it possible to reduce deformation occurring in the stack of the stacking plate 16C, the piezoelectric element 16, and the vibrating plate 15 due to the difference in coefficient of linear expansion, in comparison to when the vibrating plate 15 and the piezoelectric element 16 are directly stuck together.

Fifth Embodiment

Next, the pump 1D according to a fifth embodiment of the present disclosure will be described.

FIG. 11 is an exploded perspective view of the pump 1D according to the fifth embodiment of the present disclosure.

The pump 1D, which corresponds to a modification of the third and fourth embodiments mentioned above, includes a stacking plate 16D. As in the third and fourth embodiments mentioned above, the stacking plate 16D is further stacked for the stack of the vibrating plate 15 and the piezoelectric element 16. The stacking plate 16D used, which is disposed at a suitable position, has substantially the same disc-like outer shape as that of the piezoelectric element 16, has dimensions that are the same as or slightly larger than those of the piezoelectric element 16 in plan view, and has a coefficient of linear expansion and a thickness that satisfy a predetermined relationship with respect to the vibrating plate 15 and the piezoelectric element 16.

In the fifth embodiment, the stacking plate 16D is stacked neither between the vibrating plate 15 and the piezoelectric element 16 nor over the principal face of the vibrating plate 15 located opposite to the side where the piezoelectric element 16 is stacked. Instead, the stacking plate 16D is stacked over the principal face of the piezoelectric element 16 opposite to the side where the vibrating plate 15 is stacked. Further, the coefficient of linear expansion of the stacking plate 16D is set to a value higher than the coefficient of linear expansion of the piezoelectric element 16 and substantially equal to the coefficient of linear expansion of the vibrating plate 15. The thickness of the stacking plate 16D is set such that the larger the difference in coefficient of linear expansion between the piezoelectric element 16 and the vibrating plate 15, the larger the thickness, and conversely, the smaller the difference in coefficient of linear expansion between the piezoelectric element 16 and the vibrating plate 15, the smaller the thickness.

As already mentioned, with the stacking plate 16D set in this way, the deformation (stress) resulting from the difference in coefficient of linear expansion between the vibrating plate 15 and the piezoelectric element 16, and the deformation (stress) resulting from the difference in coefficient of linear expansion between the piezoelectric element 16 and the stacking plate 16D can be cancelled out by each other. As a result, deformation occurring in the stack of the stacking plate 16D, the piezoelectric element 16, and the vibrating plate 15 due to the difference in coefficient of linear expansion can be reduced in comparison to when the vibrating plate 15 and the piezoelectric element 16 are directly stuck together. Therefore, temperature-induced fluctuations in characteristics such as the spacing and parallelism between the striking parts 53 to 56 provided in the vibrating plate 15 and the opposed plate 13 can be reduced, and temperature-induced fluctuations in the flow rate generated by vibration of the striking parts 53 to 56 can be also reduced.

The stacking plate 16D may be made of any suitable material whose coefficient of linear expansion satisfies the above-mentioned relationship. Examples of the suitable material that may be used include metallic materials with coefficients of linear expansion higher than that of PZT-based ceramics, and resin materials.

Now, suppose that a material with a coefficient of linear expansion lower than that of the piezoelectric element 16 is used for the vibrating plate 15. In this case, the coefficient of linear expansion of the stacking plate 16D is preferably set in a manner opposite to that mentioned above. That is, the coefficient of linear expansion of the stacking plate 16D may be set lower than the coefficient of linear expansion of the piezoelectric element 16. In this case as well, the deformation (stress) resulting from the difference in coefficient of linear expansion between the vibrating plate 15 and the piezoelectric element 16, and the deformation (stress) resulting from the difference in coefficient of linear expansion between the stacking plate 16D and the piezoelectric element 16 can be cancelled out by each other. As already mentioned, this makes it possible to reduce deformation occurring in the stack of the stacking plate 16D, the piezoelectric element 16, and the vibrating plate 15 due to the difference in coefficient of linear expansion, in comparison to when the vibrating plate 15 and the piezoelectric element 16 are directly stuck together. With this configuration, although the stacking plate 16D hinders movement of the piezoelectric element 16, the piezoelectric element 16 is able to move as the piezoelectric element 16 is located away to one side from the neutral plane of the three layers made up of the stacking plate 16D, the piezoelectric element 16, and the vibrating plate 15.

Other Embodiments

Next, other embodiments of the present disclosure will be described.

FIG. 12A is a perspective view of an opposed plate 61 constituting a pump according to a sixth embodiment of the present disclosure. The opposed plate 61 includes channel-hole gathering parts 62, 63, 64, and 65 at positions corresponding to the respective striking parts 53, 54, 55, and 56 of the vibrating plate 15. Each of the channel-hole gathering parts 62, 63, 64, and 65 is made up of a plurality of channel holes that are integrated together. Each of the pump and the fluid control part according to the present disclosure may include the opposed plate 61 configured as mentioned above.

FIG. 12B is a cross-sectional view of a pump 71 according to a seventh embodiment of the present disclosure. In the pump 71, a striking part 72 in the form of a projection is provided also in the central part 21 of the vibrating plate 15. Further, a channel hole 73 of the opposed plate 13, an opening 74 of the channel plate 12, and a channel hole 75 of the cover plate 11 are provided at a position facing the striking part 72. In the pump and the fluid control part according to the present disclosure, components such as a channel hole for sucking fluid from the outside, and a striking part may be provided in this way also in the area located facing the central plate. As a result, the number of channel holes for sucking fluid from the outside can be increased, thus enabling a further increase in flow rate as well as a further improvement in driving efficiency.

FIG. 12C is a cross-sectional view of a pump 81 according to an eighth embodiment of the present disclosure. The pump 81 includes, in addition to the piezoelectric element 16 stuck on the upper face of the vibrating plate 15, a piezoelectric element 16' stuck on the lower face of the vibrating plate 15. That is, in the pump 81, the piezoelectric element 16, the vibrating plate 15, and the piezoelectric element 16' are formed as a bimorph structure. When a stack of piezoelectric element and vibrating plate is formed as a bimorph structure in this way, the amplitude of vibration of the resulting stack of piezoelectric element and vibrating plate can be increased in comparison to the structure (unimorph structure) of the stack of piezoelectric element and vibrating plate described above with reference to the first to third embodiments. Although the manner of feeding power for cases where two piezoelectric elements are disposed so as to form a bimorph structure is not particularly limited, a specific example of how power is fed in such cases will be described later.

FIG. 13A is a cross-sectional view of a pump 91A according to a ninth embodiment of the present disclosure. In the pump 91A, an opposed plate and channel holes of the opposed plate are disposed on the same side as each principal face of a vibrating plate. Specifically, the pump 91A includes a vibrating plate 15' whose upper and lower faces are each projected to form a striking part 94. Further, the pump 91A has, in addition to the cover plate 11, the channel plate 12, the opposed plate 13, and the adhesion layer 14 located on the same side as the lower face of the vibrating plate 15', a cover plate 11', a channel plate 12', an opposed plate 13', and an adhesion layer 14' disposed on the same side as the upper face of the vibrating plate 15'. The cover plate 11', the channel plate 12', and the opposed plate 13' are substantially the same in shape as and arranged in an order opposite to the cover plate 11, the channel plate 12, and the opposed plate 13, respectively. That is, the cover plate 11', the channel plate 12', and the opposed plate 13' include channel holes 39' and 40', openings 35' and 36', and channel holes 31' and 32' that are located facing the upper face of the striking part 94. Unlike the cover plate 11, the channel plate 12, and the opposed plate 13, the cover plate 11', the channel plate 12', and the opposed plate 13' respectively have openings 91, 92, and 93 at their central parts. The openings 91, 92, and 93 communicate the pump chamber with the external space. With this configuration, the openings 91, 92, and 93 have a function opposite to the channel holes 31, 32, 31', and 32', that is, function as an outlet for discharging gas to the outside.

In the pump and the fluid control part according to the present disclosure, the channel holes of the opposed plates may be provided both above and below the vibrating plate as described above. This allows for a further increase in the number of channel holes of the opposed plates, thus enabling a further increase in flow rate as well as a further improvement in driving efficiency.

FIG. 13B is a cross-sectional view of a pump 91B according to a tenth embodiment of the present disclosure. In the pump 91B, which corresponds to a modification of the pump 91A according to the ninth embodiment, an opposed plate and channel holes of the opposed plate are located on the same side as each principal face of a vibrating plate. In the pump 91B, an opening 95, which has the function of an outlet opposite to the function of the channel holes 31, 32, 31', and 32', is located not in the cover plate 11', the channel plate 12', and the opposed plate 13' but at the lateral side of the vibrating plate 15'.

In the pump and the fluid control part according to the present disclosure, an opening that has the function of an outlet opposite to the function of the channel holes 31, 32, 31', and 32' may be provided not above or below the vibrating plate but at the lateral side of the vibrating plate.

This configuration allows the inlet and the outlet to be spaced apart from each other. This allows for increased freedom in the installation of the device increases, thus enabling efficient suction and discharge of gas.

FIG. 13C is a cross-sectional view of a pump 91C according to an eleventh embodiment of the present disclosure. The pump 91C corresponds to a modification of the pumps 91A and 91B according to the ninth and tenth embodiments. In the pump 91C, the cover plates 11 and 11' are provided with no channel holes, and the channel plates 12 and 12' are provided with channels 96 that communicate the openings 35 and 36 and the openings 35' and 36' with each other, with openings 97 being provided at the lateral sides of the channel plates 12 and 12' so as to communicate with each other via the channels 96.

In the pump and the fluid control part according to the present disclosure, both the inlet and the outlet may be made to communicate with the outside not at positions above and below the vibrating plate but at the lateral sides of the vibrating plate. This configuration allows gas to be sucked in and discharged even when components such as an external board and an external housing are disposed both over and under the pump. Further, each of the inlet and the outlet areas can be gathered in one space. These features also lead to increased freedom in the installation of the device, thus allowing for efficient suction and discharge of gas.

Twelfth Embodiment

Next, an example of wiring structure employed when two piezoelectric elements and two vibrating plates are used to achieve a bimorph structure will be described with reference to a pump 201 according to a twelfth embodiment of the present disclosure.

FIG. 14 is an exploded perspective view of the pump 201. The pump 201 includes cover plates 211 and 211', channel plates 212 and 212', opposed plates 213 and 213', insulating layers 214 and 214', a vibrating plate 215, piezoelectric elements 216 and 216', and power feeding plates 217 and 217'. The cover plate 211, the channel plate 212, the opposed plate 213, the insulating layer 214, the piezoelectric element 216, and the power feeding plate 217 are disposed on the same side as the lower face of the vibrating plate 215. The cover plate 211', the channel plate 212', the opposed plate 213', the insulating layer 214', the piezoelectric element 216', and the power feeding plate 217' are disposed on the same side as the upper face of the vibrating plate 215.

The cover plate 211 is exposed at the lower principal face of the pump 201, and stuck on the lower face of the channel plate 212. The cover plate 211 has a channel hole 231 at the lower principal face of the pump 201. The channel hole 231 has a circular shape. In the twelfth embodiment, the channel hole 231 is an inlet for sucking gas from the external space.

The channel plate 212 is stacked between the cover plate 211 and the opposed plate 213. The channel plate 212 has openings 232, 233, and 234, and a channel 235 that are provided at its upper and lower faces. The opening 232, which has a circular shape with substantially the same diameter as that of the channel hole 231 of the cover plate 211, communicates with the channel hole 231 of the cover plate 211. The openings 233, which have a circular shape with substantially the same diameter as the diameter of striking parts 224 described later, are each provided at a position facing the corresponding striking part 224. The opening 234, which constitutes a part of the pump chamber, is provided at a position facing the piezoelectric element 216 and the power feeding plate 217. The channel 235, which is sandwiched by the opposed plate 213 and the cover plate 211 from above and below, extends so as to communicate the openings 232 and 233 with each other.

The opposed plate 213 is stacked between the channel plate 212 and the vibrating plate 215. The opposed plate 213 also has channel holes 236 and 237, and an opening 238 provided at its upper and lower faces. The channel hole 236, which has a circular shape with substantially the same diameter as that of the opening 232 of the channel plate 212, communicates with the opening 232 of the channel plate 212. The channel holes 237, which are provided at positions facing the striking parts 224 described later, have a circular shape that is smaller in diameter than the striking parts 224 and the openings 233 of the channel plate 212. The channel holes 237 communicate with the pump chamber and the openings 233 of the channel plate 212. The opening 238, which constitutes a part of the pump chamber, is provided at a position facing the piezoelectric element 216 and the power feeding plate 217.

The vibrating plate 215 is stacked between the opposed plate 213 and the opposed plate 213'. Although not illustrated in FIG. 14, an adhesion layer containing particles is provided at a predetermined thickness between the vibrating plate 215 and the opposed plate 213, and between the vibrating plate 215 and the opposed plate 213'. The particles forming the adhesion layer may be either electrically conductive or non-electrically conductive.

The vibrating plate 215 has a central part 221, a frame part 222, and connecting parts 223. The connecting parts 223 are provided with the striking part 224. The vibrating plate 215 has an opening 239 surrounded by the central part 221, the frame part 222, and the connecting parts 223, and a channel hole 240 provided in the frame part 222. The opening 239 constitutes a part of the pump chamber. The channel hole 240, which has a circular shape with substantially the same diameter as that of the channel hole 236 of the opposed plate 213, communicates with the channel hole 236 of the opposed plate 213.

The vibrating plate 215 includes an upper-face lateral groove 226' provided in the upper face of one side of the frame part 222, and a lower-face lateral groove 226 provided in the lower face of one side of the frame part 222 so as to overlap the upper-face lateral groove 226'. The upper-face lateral groove 226' and the lower-face lateral groove 226 extend outward from the opening 239.

The opposed plate 213' is stacked between the channel plate 212' and the vibrating plate 215. The opposed plate 213 has channel holes 236' and 237', and an opening 238' that are provided at its upper and lower faces. The channel hole 236', which has a circular shape with substantially the same diameter as that of the channel hole 240 of the vibrating plate 215, communicates with the channel hole 240 of the vibrating plate 215. The channel holes 237', which are provided at positions facing the striking parts 224, have a circular shape with a diameter smaller than the diameter of the striking parts 224, and communicate with the pump chamber. The opening 238', which constitutes a part of the pump chamber, is provided at a position facing the piezoelectric element 216' and the power feeding plate 217'.

The channel plate 212' is stacked between the cover plate 211' and the opposed plate 213'. The channel plate 212' has openings 232', 233', and 234', and a channel 235' that are provided at its upper and lower faces. The opening 232', which has a circular shape with substantially the same diameter as that of the channel hole 236' of the opposed plate 213', communicates with the channel hole 236' of the opposed plate 213'. The openings 233', which have a circular shape with substantially the same diameter as the diameter of the striking parts 224, are each provided at a position facing the corresponding striking part 224, and communicate with the channel holes 237' of the opposed plate 213'. The opening 234', which constitutes a part of the pump chamber, is provided at a position facing the piezoelectric element 216' and the power feeding plate 217'. The channel 235', which is sandwiched by the cover plate 211' and the opposed plate 213' from above and below, extends so as to communicate the openings 232' and 233' with each other.

The cover plate 211' is exposed at the upper principal face of the pump 201, and stuck on the upper face of the channel plate 212'. The cover plate 211' has a channel hole 231' at the upper principal face of the pump 201. The channel hole 231' has a circular shape, and communicates with the opening 234' (pump chamber) of the channel plate 212'. In the twelfth embodiment, the channel hole 231' is an outlet for discharging gas to the external space.

The piezoelectric element 216, which is disc-shaped, is stuck onto the lower face of the central part 221 of the vibrating plate 215. The upper face of the piezoelectric element 216 is electrically connected to the first external connection terminal 225 through the vibrating plate 215.

The piezoelectric element 216', which is disc-shaped, is stuck onto the upper face of the central part 221 of the vibrating plate 215. The lower face of the piezoelectric element 216' is electrically connected to the first external connection terminal 225 through the vibrating plate 215.

In the present example, the power feeding plate 217 is in the form of a beam that is bent at its distal end. The distal end of the power feeding plate 217 is joined to the lower face of the piezoelectric element 216 by a method such as soldering, thus mechanically and electrically connecting the distal end to the lower face of the piezoelectric element 216. The proximal end of the power feeding plate 217 extends to the outside through the lower-face lateral groove 226 of the vibrating plate 215. In the present example, the power feeding plate 217' is in the form of a beam that is bent at its distal end in a direction opposite to the power feeding plate 217. The distal end of the power feeding plate 217' is joined to the upper face of the piezoelectric element 216' by a method such as soldering, thus mechanically and electrically connecting the distal end to the upper face of the piezoelectric element 216'. The proximal end of the power feeding plate 217' extends to the outside through the upper-face lateral groove 226' of the vibrating plate 215.

The insulating layer 214 is made of an adhesive containing insulating particles, and secures the power feeding plate 217 inside the lower-face lateral groove 226. The insulating layer 214' is made of an adhesive containing insulating particles, and secures the power feeding plate 217' inside the upper-face lateral groove 226'.

FIG. 15A is a perspective view of a stack made up of the vibrating plate 215, the piezoelectric elements 216 and 216' (the piezoelectric element 216 is not illustrated), the power feeding plates 217 and 217', and the insulating layers 214 and 214'. FIG. 15B is an enlarged perspective view of an area in the vicinity of the insulating layers 214 and 214'.

The insides of the upper-face lateral groove 226' and the lower-face lateral groove 226 of the frame part 222 are respectively filled with the coatings of the insulating layer 214' and the insulating layer 214. The power feeding plates 217 and 217' are respectively positioned so as to pass through the insides of the insulating layers 214 and 214'. As a result, the power feeding plates 217 and 217' are led to the outside without being bright into electrical continuity with the vibrating plate 215 and the first external connection terminal 225. The proximal end of each of the power feeding plates 217 and 217' thus functions as a second external connection terminal.

The insulating layers 214 and 214' are each made of an adhesive having insulating property. Non-electrically conductive particles are mixed in the adhesive. This ensures that the insulating layers 214 and 214' with a thickness equal to or greater than the particle diameter of the non-electrically conductive particles is present between the power feeding plates 217 and 217' and the vibrating plate 215, respectively.

The insulating layers 214 and 214' may not contain non-electrically conductive particles. In that case, it is desirable to, for example, provide an insulating coating of an insulating material or an oxide film at locations where the power feeding plate 217 or 217' or the vibrating plate 215 is exposed inside the upper-face lateral groove 226' or the lower-face lateral groove 226. This configuration also reliably prevents electrical continuity between the power feeding plates 217 and 217', and the vibrating plate 215 and the first external connection terminal 225.

In the pump 201 configured as described above, driving the piezoelectric elements 216 and 216' causes gas to be sucked in from the outside through the channel hole 231 of the cover plate 211 illustrated in FIG. 14. Then, the gas flows into the pump chamber from the channel hole 231 of the cover plate 211, through the opening 232, the channel 235, and the openings 233 of the channel plate 212, and the channel holes 237 of the opposed plate 213. At the same time, fluid flows into the pump chamber in a parallel fashion from the channel hole 231 of the cover plate 211, through the opening 232 of the channel plate 212, the channel hole 236 of the opposed plate 213, the channel hole 240 of the vibrating plate, the channel hole 236' of the opposed plate 213', the opening 232', the channel 235', and the openings 233' of the channel plate 212', and the channel holes 237' of the opposed plate 213'. Then, the fluid is discharged to the outside from the pump chamber through the channel hole 231' of the cover plate 211'.

Therefore, in the pump and the fluid control device according to the twelfth embodiment as well, the channel holes of the opposed plates can be positioned both above and below the vibrating plate, thus enabling a further increase in suction flow rate as well as a further improvement in driving efficiency. Further, the inlet areas through which gas is sucked in from the outside and the outlet areas through which gas is discharged to the outside can be gathered in one space. This increases the freedom in the installation of the device, thus allowing for efficient suction and discharge of gas.

Although the present disclosure can be practiced as in the embodiments described above, the present disclosure can be also practiced in other embodiments. For example, although the above-described embodiments use, as a driver, a piezoelectric element that undergoes expansion and contraction in the in-plane direction, the present disclosure is not limited to this. For example, the vibrating plate may be vibrated in a flexural manner through electromagnetic drive. Although the piezoelectric element is made of PZT-based ceramic in the above-described embodiments, the present disclosure is not limited to this. For example, the piezoelectric element may be made of a non-lead piezoelectric ceramic material such as potassium sodium niobate-based ceramic and alkali niobate-based ceramic.

In the above-described embodiments, the striking part provided in each of the connecting parts has such a shape that is locally increased in width relative to the surrounding areas of the connecting part and projects toward the bottom side. However, the present disclosure is not limited to this. For example, the striking part may be the same in width or thickness as other areas in the connecting part.

Although the piezoelectric element and the central part of the vibrating plate, and the striking parts and the movable part have diameters similar to each other in the above-described embodiments, the present disclosure is not limited to this. For example, the central part of the vibrating plate may be sufficiently larger than the piezoelectric element. Further, either the striking parts or the movable part may be sufficiently larger than the other. Although parts such as the piezoelectric element, the central part of the vibrating plate, and the striking parts are circular in shape in the above-described embodiments, the present disclosure is not limited to this. For example, parts such as the piezoelectric element, the central part of the vibrating plate, and the striking parts may be rectangular or polygonal in shape.

Although the vibrating plate is provided with four connecting parts and four striking parts, and the opposed plate is provided with four channel holes and the movable part in the above-described embodiments, the present disclosure is not limited to this. Parts such as the piezoelectric element, the central part of the vibrating plate, and the striking parts may be rectangular or polygonal in shape. For example, parts such as the connecting parts, the striking parts, the channel holes of the opposed plate, and the movable part may be provided in two, three, or five or more locations.

Although the frequency of the alternating-current driving signal is determined so as to vibrate the vibrating plate in a third-order resonant mode in the above-described embodiments, the present disclosure is not limited to this. For example, the frequency of the alternating-current driving signal may be determined so as to vibrate the fluid control part in other resonant modes such as a fifth-order resonant mode and a seventh-order resonant mode.

Although the above-described embodiments use a gas as an example of fluid, the present disclosure is not limited to this. For example, the fluid may be a liquid, a gas-liquid mixture, a solid-liquid mixture, or a solid-gas mixture. Although fluid is sucked into the pump chamber through the channel holes provided in the opposed plate in the above-described embodiments, the present disclosure is not limited to this. For example, fluid may be discharged from the pump chamber through the channel holes provided in the opposed plate. Whether fluid is sucked or discharged through the channel holes provided in the opposed plate is determined in accordance with the direction of a travelling wave represented as the difference in vibration between the striking parts and the movable part.

Lastly, the foregoing description of the embodiments is intended to be illustrative in all respects and not to be construed as limiting. The scope of the present disclosure is defined not by the above embodiments but by the appended claims. Further, the scope of the present disclosure is intended to include all modifications that fall within the meaning and scope of the claims and any equivalents thereof.

1, 1A, 1B, 1C, 1D, 71, 81, 91A, 91B, 91C, 201 pump
2 housing
3, 4 external connection terminal
5, 6 principal face
11, 11', 11A, 211, 211' cover plate
12, 12', 12A, 212, 212' channel plate
13, 13', 13A, 61, 213, 213' opposed plate
14, 14', 214, 214' adhesion layer
15, 15', 215 vibrating plate
16, 16', 216, 216' piezoelectric element
16B, 16C, 16D, 16D stacking plate
17 insulating plate
17A metal plate
18, 217, 217' power feeding plate
19 spacer plate
20 lid plate
21, 221 central part
22, 222 frame part
23, 24, 25, 26, 223 connecting part
27 internal connection g terminal
31, 32, 33, 34, 31', 32', 31A, 32A, 33A, 34A, 39, 39', 40, 40', 41, 42, 50, 73, 75, 231, 231', 236, 237, 236', 237', 240 channel hole
35, 36, 35', 36', 37, 38, 39', 40', 35B, 36B, 37B, 38B, 39A, 40A, 41A, 42A, 43, 44, 45, 46, 47, 48, 49, 74, 91, 92, 93, 94, 97, 232, 233, 234, 232', 233', 234', 238, 238', 239 opening
35A, 36A, 37A, 38A, 96, 235, 235' channel
35C, 36C, 37C, 38C extension
51 pump chamber
52 housing
53, 54, 55, 56, 72, 94, 224 striking part
57 movable part
58 restraining part
59 fluid control part (fluid control device)
62, 63, 64, 65 channel-hole gathering part
225 external connection terminal
226 lower-face lateral groove
226' upper-face lateral groove

The invention claimed is:

1. A fluid control device comprising:
an inlet for sucking fluid from an external space into the fluid control device,
an outlet for discharging the fluid from within the fluid control device to the external space,
a vibrating plate having a central part, a frame part surrounding the central part, and a connecting part connecting between the central part and the frame part;
a driver stacked over the central part, the driver being configured to vibrate the vibrating plate in a flexural manner from the central part to the connecting part; and
an opposed plate stacked over the frame part, the opposed plate being spaced apart from and opposed to at least the connecting part,
wherein the vibrating plate has a resonant mode such that an antinode occurs in each of the central part and the connecting part,
wherein the opposed plate has a plurality of channel holes through which the fluid flows, each of the channel holes being located at a position opposed to the connecting part, and
wherein during operation of the fluid control device, the fluid is sucked through the inlet, flows through the plurality of channel holes, and is discharged through the outlet.

2. The fluid control device according to claim 1, wherein the connecting part includes, at a position opposed to each of the channel holes, a striking part having a width that is locally increased as viewed from the channel holes.

3. The fluid control device according to claim 1, wherein the connecting part includes, at respective positions opposed to each of the channel holes, a projection; and the projection projects towards the channel hole.

4. The fluid control device according to claim 1,
wherein the opposed plate includes, around each of the channel holes, a projection projecting toward the vibrating plate.

5. The fluid control device according to claim 1,
wherein the opposed plate includes:
a movable part that is bendable and provided around each of the channel holes, and
a restraining part restraining an area around the movable part.

6. The fluid control device according to claim 5,
wherein the movable part has a shape in a plan view having a major axis extending in a direction of producing antinodes uniformly in the connecting part, and a minor axis extending in a direction orthogonal to the major axis.

7. The fluid control device according to claim 5, further comprising a channel part stacked over a side of the opposed plate opposite to the vibrating plate, the channel part having:
a plurality of channels communicating with the channel holes of the opposed plate, each channel including an opening and an extension extended laterally from the opening, the opening being opposed to a respective channel hole of the opposed plate and an area around the respective channel hole, and
a plurality of holes opened to the external space, each hole communicating with a respective opening of the channels through the extension extended laterally from the respective opening.

8. The fluid control device according to claim 7,
wherein at least one of the channel part and the opposed plate has a coefficient of linear expansion substantially equal to a coefficient of linear expansion of the vibrating plate.

9. The fluid control device according to claim 1,
wherein the opposed plate is stacked over the vibrating plate by using an adhesive, and
wherein the opposed plate has an opening extending along an inner boundary of the frame part of the vibrating plate.

10. The fluid control device according to claim 1,
wherein the vibrating plate and the opposed plate are each made of an electrically conductive material,
wherein the opposed plate and the vibrating plate are stacked by using an adhesive containing electrically conductive particles, and
wherein each of the electrically conductive particles has a particle diameter equivalent to a spacing between the opposed plate and the vibrating plate.

11. The fluid control device according to claim 1, further comprising:
an insulating layer stacked over the frame part, the insulating layer being positioned over a side of the vibrating plate over which the driver is stacked; and
a power feeding plate stacked over the vibrating plate with the insulating layer interposed between the power feeding plate and the vibrating plate, the power feeding plate having an internal connection terminal formed in a part of the power feeding plate, the internal connection terminal being connected to the driver.

12. The fluid control device according to claim 11,
wherein the insulating layer includes an insulating coating located between the vibrating plate and the power feeding plate.

13. The fluid control device according to claim 11,
wherein the insulating layer includes an adhesive mixed with non-electrically conductive particles.

14. The fluid control device according to claim 11, further comprising
a metal plate stacked over the frame part of the vibrating plate.

15. The fluid control device according to claim 11,
wherein the frame part of the vibrating plate has a groove located on a side of the vibrating plate over which the driver is stacked, and
wherein the insulating layer and the power feeding plate are disposed in the groove.

16. The fluid control device according to claim 1, wherein the opposed plate has another channel hole at a position opposed to the central part.

17. The fluid control device according to claim 1, further comprising:
a stacking plate further stacked over the vibrating plate and the driver,
wherein the vibrating plate, the driver, and the stacking plate form three layers, the three layers being an upper layer, a middle layer, and a lower layer, and
wherein a coefficient of linear expansion of the middle layer is either:
equal to each of a coefficient of linear expansion of the upper layer and a coefficient of linear expansion of the lower layer,
greater than each of the coefficient of linear expansion of the upper layer and the coefficient of linear expansion of the lower layer, or
less than each of the coefficient of linear expansion of the upper layer and the coefficient of linear expansion of the lower layer.

18. The fluid control device according to claim 17,
wherein among the three layers, a layer in contact with the driver has a coefficient of linear expansion greater than a coefficient of linear expansion of the driver.

19. The fluid control device according to claim 1,
wherein the opposed plate includes a first opposed plate and a second opposed plate, the first opposed plate being opposed to one principal face of the vibrating plate, the second opposed plate being opposed to the other principal face of the vibrating plate.

20. The fluid control device according to claim 1,
wherein the driver includes a first driver and a second driver, the first driver being opposed to one principal face of the vibrating plate, the second driver being opposed to the other principal face of the vibrating plate.

21. A pump comprising:
an inlet for sucking fluid from an external space into the pump,
an outlet for discharging the fluid from within the pump to the external space,
a vibrating plate having a central part, a frame part surrounding the central part, and a connecting part connecting between the central part and the frame part;
a driver stacked over the central part, the driver being configured to vibrate the vibrating plate in a flexural manner from the central part to the connecting part; and
an opposed plate stacked over the frame part, the opposed plate being spaced apart from and opposed to at least the connecting part,
wherein the vibrating plate has a resonant mode such that an antinode occurs in each of the central part and the connecting part, wherein the opposed plate has a plurality of channel holes through which the fluid flows, each of the channel holes being located at a position opposed to the connecting part, wherein the pump further comprises a pump chamber accommodating the vibrating plate and the driver, wherein the opposed plate forms a part of an inner wall of the pump chamber; and wherein during operation of the pump, the fluid is sucked through the inlet, flows through the plurality of channel holes, and is discharged through the outlet.

* * * * *